United States Patent
Loughlin-McHugh et al.

(10) Patent No.: US 9,519,796 B1
(45) Date of Patent: Dec. 13, 2016

(54) SYSTEMS AND METHODS FOR ELECTRONIC TICKET MANAGEMENT

(71) Applicant: Yoti Ltd, London (GB)

(72) Inventors: Eleanor Simone Frederika Loughlin-McHugh, London (GB); Roman Edward Szczesniak, London (GB); Duncan Francis, London (GB)

(73) Assignee: Yoti Ltd, London (GB)

( * ) Notice: Subject to any disclaimer, the term of this patent is extended or adjusted under 35 U.S.C. 154(b) by 7 days.

(21) Appl. No.: 14/726,315

(22) Filed: May 29, 2015

(51) Int. Cl.
*H04L 29/02* (2006.01)
*G06F 21/62* (2013.01)
*H04L 29/08* (2006.01)
*H04L 9/32* (2006.01)

(52) U.S. Cl.
CPC ......... *G06F 21/6218* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 7,523,191 B1 * | 4/2009 | Thomas | G06F 11/3438 709/202 |
| 2010/0179884 A1 * | 7/2010 | Glaser | G06Q 30/08 705/26.1 |
| 2013/0238372 A1 | 9/2013 | Jordan | |

FOREIGN PATENT DOCUMENTS

GB  2461963 A  1/2010

OTHER PUBLICATIONS

A Privacy Enhancing Service Architecture for Ticket-based Mobile Applications. Jorns et al. IEEE(2007).*
Unpublished related U.S. Appl. No. 14/622,709, filed Feb. 13, 2015, in 122 pages.
Preliminary Amendment filed May 1, 2015 in unpublished related U.S. Appl. No. 14/622,709, in 7 pages.
Unpublished related U.S. Appl. No. 14/622,527, filed Feb. 13, 2015, in 123 pages.
Preliminary Amendment filed May 1, 2015 in unpublished related U.S. Appl. No. 14/622,527, in 8 pages.
Unpublished related U.S. Appl. No. 14/622,549, filed Feb. 13, 2015, in 123 pages.
Preliminary Amendment filed May 1, 2015 in unpublished related U.S. Appl. No. 14/622,549, in 3 pages.
Unpublished related U.S. Appl. No. 14/622,737, filed Feb. 13, 2015, in 130 pages.

(Continued)

*Primary Examiner* — Venkat Perungavoor
(74) *Attorney, Agent, or Firm* — Knobbe Martens Olson & Bear LLP

(57) ABSTRACT

A computer system according to certain aspects uses past ticket usage data indicating a probability that a respective entity would personally use a ticket issued to them based on a history of past ticket usage. A ticket controller can respond to ticket requests by determining whether a ticket should be issued to a requesting entity based on the past ticket usage data associated with the requesting entity's profile, and if so issue a ticket to the requesting entity in electronic form. The system can receive a ticket use notification and update the past ticket usage data associated with the requesting entity's profile based on the ticket use notification, where the updated past ticket usage data conveys whether the requesting entity presented the ticket themselves.

19 Claims, 9 Drawing Sheets

(56) References Cited

OTHER PUBLICATIONS

Preliminary Amendment filed May 1, 2015 in unpublished related U.S. Appl. No. 14/622,737, in 9 pages.
Unpublished related U.S. Appl. No. 14/622,740, filed Feb. 13, 2015, in 122 pages.
Preliminary Amendment filed May 1, 2015 in unpublished related U.S. Appl. No. 14/622,740, in 8 pages.
Unpublished related U.S. Appl. No. 14/726,333, filed May 29, 2016, in 66 pages.
Preliminary Amendment filed Jun. 30, 2015 in unpublished related U.S. Appl. No. 14/726,333, in 11 pages.
Loughlin-McHugh et al., U.S. Appl. No. 14/726,315, filed May 29, 2015, Systems and Methods for Electronic Ticket Management.
International Search Report mailed Jul. 1, 2016 in corresponding International Application No. PCT/EP2016/062034, filed May 26, 2016.

* cited by examiner

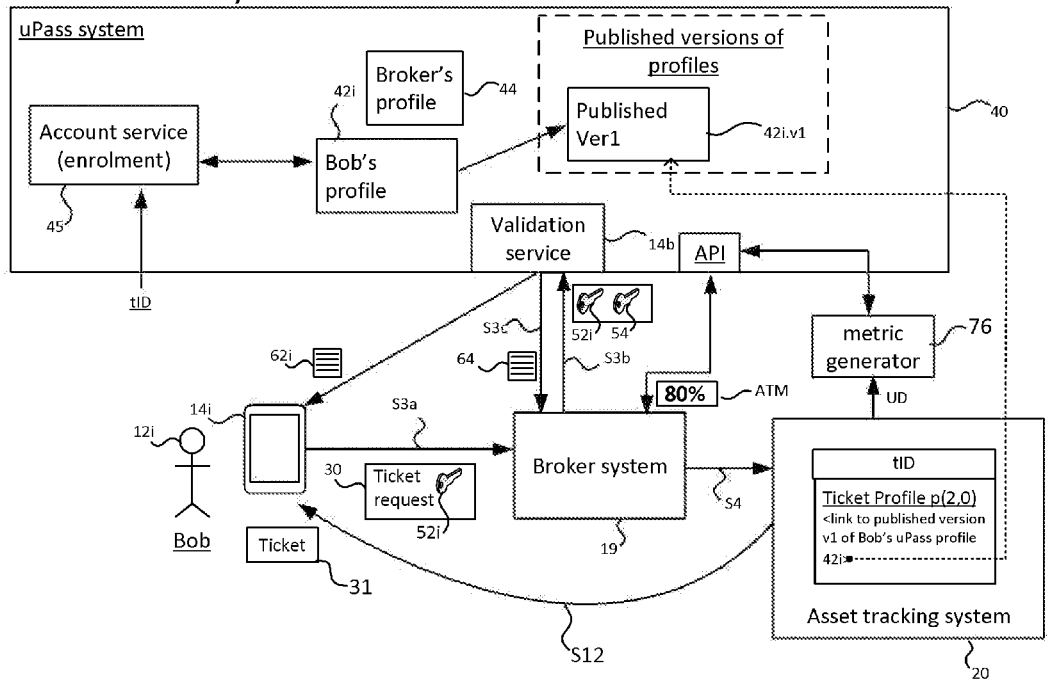
FIG. 5A: Bob buys ticket
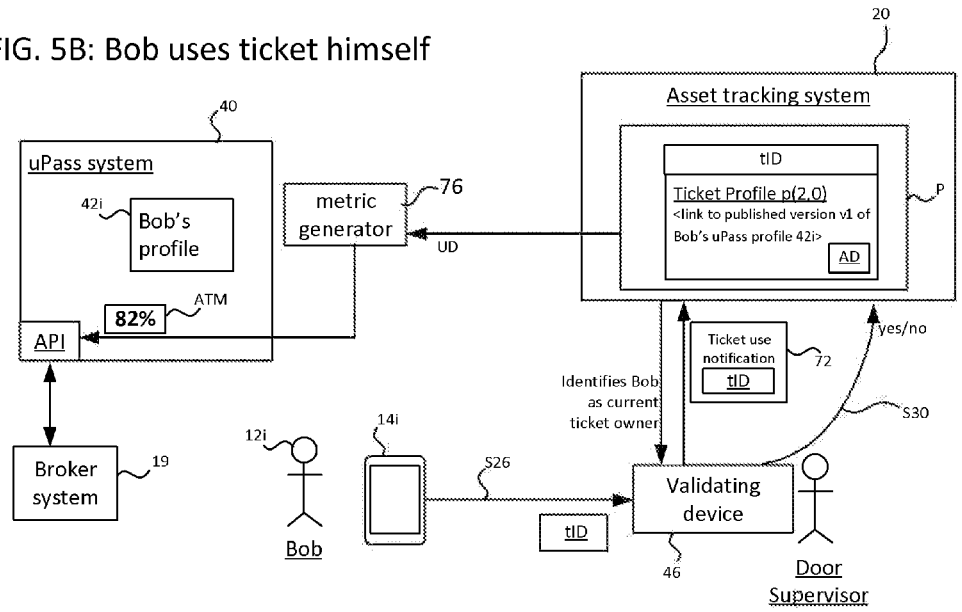
FIG. 5B: Bob uses ticket himself

FIG. 5C: Bob transfers ticket to Alice
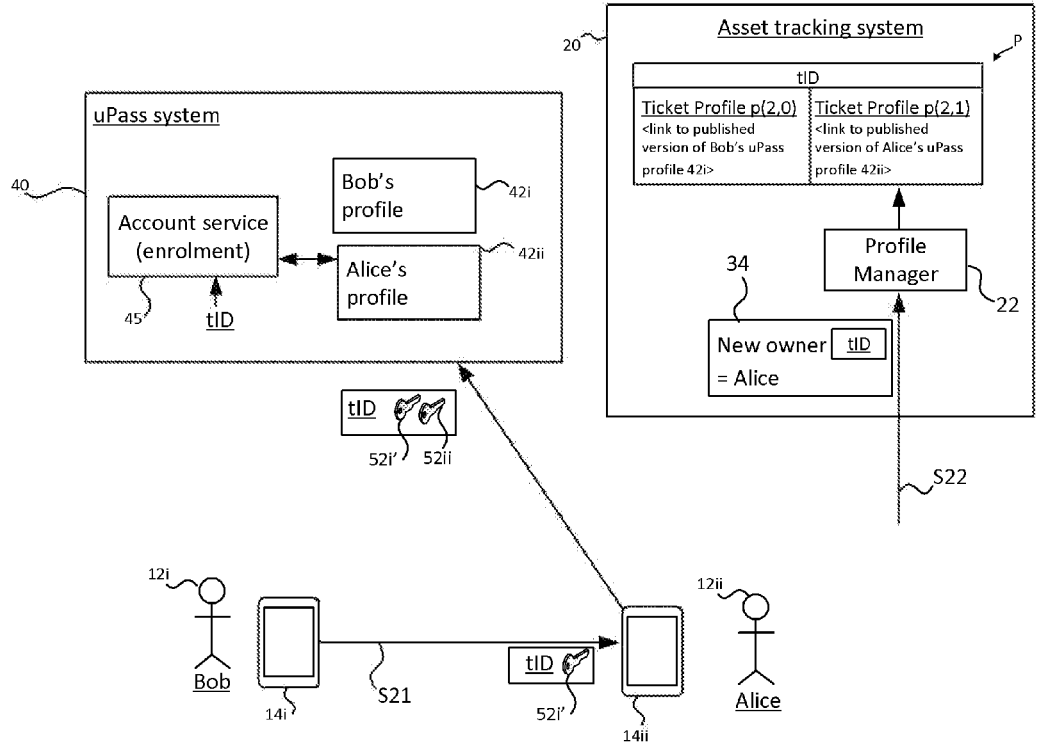
FIG. 5D: Alice uses ticket
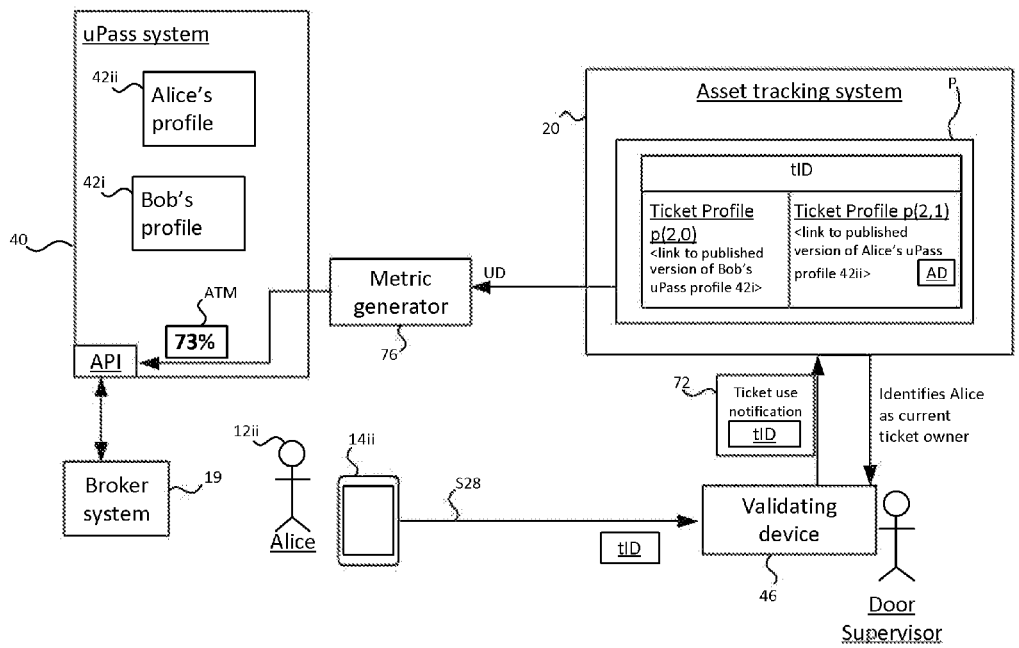

Valid owner (e.g. Alice or Bob) uses ticket in preferred implementation

SYSTEMS AND METHODS FOR ELECTRONIC TICKET MANAGEMENT

INCORPORATION BY REFERENCE TO RELATED APPLICATIONS

This application relates to the following U.S. patent applications the complete disclosures of which are incorporated herein by reference in their entirety.

| application Ser. No. | Title | Date Filed |
| --- | --- | --- |
| 14/726,333 | ELECTRONIC SYSTEMS AND METHODS FOR ASSET TRACKING | May 29, 2015 |
| 14/622,527 | DIGITAL IDENTITY | Feb. 13, 2015 |
| 14/622,737 | DIGITAL IDENTITY | Feb. 13, 2015 |
| 14/622,709 | DIGITAL IDENTITY SYSTEM | Feb. 13, 2015 |
| 14/622,549 | CONFIDENCE VALUES | Feb. 13, 2015 |

BACKGROUND

Field

The described technology is in the field of computer-implemented data management.

Description of the Related Art

Historically, tickets to events would be issued in person, for example at the venue of an event either beforehand or "on the door" at the time of the event itself. However, nowadays, ticket management is moving more and more into the digital domain, whereby tickets are requested and issued via the Internet. Whilst this is generally beneficial for users in terms of convenience, it nevertheless comes with its own set of problems.

Where tickets are made freely available without restriction, soon touts will follow. Ticket touting is the practice of an entity (tout) acquiring a potentially large number of tickets to, say, an event which they have no intention of using personally, i.e. where they have no intention of attending the event themselves, particularly for the purpose of selling them on at a premium. Whilst popular, oversubscribed events in particular have always been somewhat vulnerable to touting, historically the inter-personal nature of ticket purchases kept touting in check to some extent.

However the problem of touting is being exacerbated as ticket management moves more and more towards Internet based systems. Not only is this removing the inter-personal aspect of ticket acquisition, but a specific problem that has arisen as ticket management becomes digitized is the ever-increasing presence of "bots". A bot is a software-implemented artificial intelligence deployed on a computer network such as the Internet, in this case acting as a tout i.e. programmed with a function of acquiring a potentially large number of tickets en masse as soon as they become available on the Internet, often in a very short space of time so as to deprive legitimate (i.e. non-touting) users.

A problem also exists regarding ticket allocation and identification. Sometimes a ticket seller or broker will mandate that a ticket purchaser has to show up at the venue with some form of identification (e.g. payment card) to prove that the person showing up is the original purchaser of the tickets, or a legitimate re-purchaser who has re-purchased the ticket(s) via the broker's own system. However, in practice the time and effort this involves, and the delays it would result in, means that this is not enforced in practice. In other words, existing mechanisms for linking identity to tickets are unworkable in practice. This is particularly, though not exclusively true of physical tickets.

SUMMARY OF CERTAIN INVENTIVE ASPECTS

A problem solved by the described technology is one of constructing an automated ticketing system that is robust to touting but does not place undue restrictions on legitimate (i.e. non-touting) users and requires minimal manual oversight.

A first aspect of the described technology is directed to an automated ticketing computer system that implements a robust, automated anti-touting mechanism. The mechanism detects touting behaviour by entities, such as humans or possibly artificial intelligence entities, within the system, based on historical ticket usage, and can where necessary automatically inhibit future ticket acquisitions for detected touting entities, without human intervention being necessary to achieve this. The inhibition mechanisms are targeted on detected touts, so as not to restrict legitimate movement of tickets within the system unnecessarily. The touting detection is made possible by linking digital identity to tickets, so that each ticket has a clearly assigned owner within the system.

In accordance with the first aspect a computer system comprises: a data store holding: a plurality of profiles, each of a respective entity and stored in association with past ticket usage data indicating a probability that the respective entity would personally use a ticket issued to them based on a history of past ticket usage; a computer interface configured to receive a ticket request from a requesting device via a computer network, the ticket request identifying a profile of a requesting entity; one or more processors configured to execute code for managing tickets, the code configured when executed to implement: a ticket controller configured to: in response to the ticket request, determine whether a ticket should be issued to the requesting entity based on the past ticket usage data associated with the requesting entity's profile, and if so issue a ticket to the requesting entity in electronic form via the network, a receiving module configured to receive a ticket use notification from a validating device via the network, the ticket use notification indicating: identity data of the requesting entity and identity data of a presenting entity that has presented the issued ticket to the validating device, and a profile manager configured to: update the past ticket usage data associated with the requesting entity's profile based on the ticket use notification, wherein the updated past ticket usage data conveys whether the requesting entity presented the ticket themselves.

Both the issuing and the use of the ticket are tied to the requesting entity's profile. The requesting entity may for example be a purchaser of the ticket, purchasing it via the network (e.g. Internet). "Ticket use" in this context means presenting the ticket to the validating device, which is e.g. available to an event organizer, to gain admission to a ticketed event.

By tying ticket issuing and use to the requesting entity's profile in this manner, it is possible to detect when the requesting entity is obtaining ticket(s) to an event, but not using any of those ticket(s) themselves. This is indicative of touting behaviour and where a profile is used to buy tickets for many events but never (or hardly ever) used to gain admission to those events, it can be concluded that that profile is of a touting entity with a high level of statistical certainty. Conversely, it is possible to detect when the same entity is both acquiring a ticket (or a set of multiple tickets)

and also using that ticket (or one of that set of tickets) to gain admission to that event. This is indicative of legitimate (i.e. non-touting) behaviour, and where a profile is used to both to buy tickets for and gain admission to multiple events, it can be concluded that that profile is of a legitimate (i.e. non-touting) entity.

Tying the tickets to profiles also makes it harder for bots to even gain access to tickets in the first place, particularly if the profiles are tied to an official identity document such as a passport.

In certain embodiments, no limits are placed on the number of tickets that can be issued to a legitimate entity at all, nor (in some cases) are any limits places on the transfer of tickets between legitimate entities, so that only the activities of identified touting entities are curtailed. In other embodiments, some restrictions may still be placed on legitimate users, e.g. on the number of tickets a legitimate user can purchase to ensure a fair distribution of tickets across all legitimate users, though generally these will be less stringent than those placed on identified touting entities.

The past ticket usage data in a profile of an entity may for example be in the form of a value pair (Nu, Na) or a ratio Nu/Na or other metric function m(Na,Nu) of NA and Nu. Here Na represents the number times that profile has been used to acquire tickets (for example by acquiring them directly from a ticket issuer or indirectly from another entity(s) e.g. through a re-sale), and Nu represents the number times that that profile has been used both to acquire tickets and to gain admission to the corresponding events i.e. the number of times the entity has actually shown up at events they have bought tickets to. For legitimate users, Nu will equal or be close to Na i.e. a ratio close to 1; for touting entities, such as human touts or touting bots, Nu will be equal or close to zero i.e. a ratio close to 0. In some cases, the ratio may be biased initially to give entities the benefit of the doubt e.g. Na and Nu may be initialized as, say, Na=Nu=50 to lessen the effect of the entity's first actions on the ratio. Alternatively, Na may represent the number of times the entity has bought tickets but not shown up, so that for legitimate users Nu is equal or close to zero, and for touts it is equal or close to Na. Alternatively the past ticket usage data may, for example, convey the probability indirectly— e.g. it may comprise, for each event for which that profile was used to buy tickets, a respective flag indicating whether or not that profile was also used to gain admission to that event.

When the profile manager detects that the identity data of the presenting entity does match that of the requesting entity (indicating the presenting entity and the requesting entity are the same person i.e. the requesting entity is a person who has shown up at the event), the past ticket usage data may be updated so that the probability indicated thereby increases. Conversely, where the profile manager detects that the identity data of the presenting entity does not match that of the requesting entity (indicating that the requesting entity has not shown up at the event), the past ticket usage data may be updated so that the probability indicated thereby is decreased.

A key aspect is that identify is being validated at the same time as the ticket, in a non-intrusive and practicable way. The identity of the person presenting the ticket is validated by the system as well as validating the ticket itself, and checked against the identity of the original ticket purchaser. This is in contrast to, say, scanning a barcode on a conventional electronic or paper ticket, as this only validates the ticket itself and not the person presenting it.

Note, where an entity acquires a set of multiple tickets for a single event, the probability that the entity would personally use a ticket issued to them means the probability of the user using any one of the tickets in the set (giving the remainder e.g. to friends or family).

In embodiments, the updated past ticket usage data may indicate the identity data of the requesting and presenting entities, and the processor(s) may be configured to use the updated past ticket usage data to compare the identity data of the presenting entity with the identity data of the requesting entity to detect whether they match. The ticket controller may be configured to determine whether to reject a future ticket request from the requesting entity based on said comparison. For example said comparison may be performed in response to receiving the future ticket request.

The identity data of the requesting entity and the identity data of the presenting entity may be stored in the computer system and associated with a ticket identifier of the ticket, and the ticket use notification may comprise the ticket identifier and thereby indicates the identity data of the requesting entity and the identity data of the presenting entity.

For example the identity data of the requesting entity may form part of the requesting entity's profile. E.g. the ticket request may comprise a credential bound to the requesting entity's profile, and the processor(s) may be configured to implement a validation service for validating credentials, and the ticket may be issued only if the credential is valid.

The identity data of the requesting entity and the identity data of the presenting entity may comprise a hash of at least part of a payment account number issued to the requesting entity and a hash of at least part of a payment account number issued to the presenting entity respectively.

Alternatively or additionally the identity data of the requesting entity and the identity data of the presenting entity may each comprise a string unique to that entity. For example, the unique string of the presenting entity may be received from the validating device in the ticket use notification, having been presented to the validating device with the ticket by the presenting entity.

The computer system may be configured to associate a profile identifying a true owner of the ticket with the ticket identifier. An identifier of the true owner may be transmitted to and outputted by the validating device in response to the ticket being presented to the validating device, and the updating of the past ticket usage data may be conditional on a user of the validating device indicating via the validating device that the presenting entity is the true owner. For example, the profile of the true owner may be associated with the ticket identifier in response to receiving a change of ownership notification identifying the ticket and the true owner. Alternatively, the profile of the true owner may be the profile of the requesting entity.

The computer system may comprise an asset tracking system, and the identity data of at least one of the entities may form part of a profile of the ticket in the asset tracking system of, the ticket use notification identifying the profile of the ticket.

The computer system may comprise an asset tracking system, and a profile of the ticket in the asset tracking system may comprise a link to the identity data of at least one of the entities, the ticket use notification identifying the profile of the ticket and the link being used to retrieve the identity data of the at least one entity.

The processor(s) may be configured to implement an association module configured, in response to the ticket request, to create an association in the data store between the requesting entity's profile and a ticket identifier of the issued ticket. The ticket use notification may comprise the ticket identifier and thereby indicate the identity data of the requesting entity. The profile manager may be configured to use the ticket identifier received in the ticket use notification to retrieve the identity data of the requesting entity for said comparison based on the association created by the association module.

The ticket use notification may indicate the identity data of the presenting entity by identifying a profile of the presenting entity that comprises that identity data. Alternatively or in addition, the ticket use notification may comprise the identity data of the presenting entity and thereby indicates it.

The ticket use notification may comprise the identity data of the requesting entity and thereby indicates it.

A second aspect is directed to a method implemented by a computer system comprising a data store holding a plurality of profiles, each of a respective entity and stored in association with past ticket usage data indicating a probability that the respective entity would personally use a ticket issued to them based on a history of past ticket usage, the method comprising: receiving a ticket request from a requesting device via a computer network, the ticket request identifying a profile of a requesting entity; in response to the ticket request, determining whether a ticket should be issued to the requesting entity based on the past ticket usage data associated with the requesting entity's profile, and if so issue a ticket to the requesting entity in electronic form via the network; receiving a ticket use notification from a validating device via the network, the ticket use notification indicating: identity data of the requesting entity and identity data of a presenting entity that has presented the issued ticket to the validating device; and updating the past ticket usage data associated with the requesting entity's profile based on the ticket use notification, wherein the updated past ticket usage data conveys whether the requesting entity presented the ticket themselves.

A third aspect is directed to a computer system for detecting ticket touting comprising: a ticket issuer configured to selectively issue tickets to ticket requesting entities; electronic storage holding, for each of multiple issued tickets, an initial profile of that ticket in association with a ticket identifier of that ticket; a computer interface configured to receive ticket transfer notifications, each ticket transfer notification identifying a respective one of the issued tickets and a respective entity participating in a transfer of the respective ticket; a profile manager configured to, each time a ticket transfer notification is received, create in the electronic storage a new ticket profile of the respective ticket comprising an identifier of the respective participating entity; an association module configured to, each time a new ticket profile is created, associate the new ticket profile with the next most recent profile of the same ticket, thereby creating multiple temporal sequences in the electronic storage, each representing a chain of transfer of one of the tickets; and an analyser configured to analyse the temporal sequences to detect when an entity identified in at least some of the temporal sequences satisfies a touting condition, wherein the ticket issuer is configured to determine whether to reject a ticket request received from that entity based on said detection.

A fourth aspect is directed to a method of detecting ticket touting comprising: creating in electronic storage, for each of multiple issued tickets, an initial profile of that ticket in association with a ticket identifier of that ticket; receiving ticket transfer notifications, each ticket transfer notification identifying a respective one of the issued tickets and a respective entity participating in a transfer of the respective ticket; each time a ticket transfer notification is received, creating in the electronic storage a new ticket profile of the respective ticket comprising an identifier of the respective participating entity; each time a new ticket profile is created, associating the new ticket profile with the next most recent profile of the same ticket, thereby creating multiple temporal sequences in the electronic storage, each representing a chain of transfer of one of the tickets; and analyzing the temporal sequences to detect when an entity identified in at least some of the temporal sequences satisfies a touting condition, and determining whether to reject a ticket request received from that entity based on said detection.

In another aspect, a computer system comprises: a data store holding a plurality of profiles, each of a respective entity and comprising past ticket usage data indicating a probability that the respective entity would personally use a ticket issued to them based on a history of past ticket usage; a computer interface configured to receive a ticket request from a requesting device via a computer network, the ticket request identifying a profile of a requesting entity; one or more processors configured to execute code for managing tickets, the code configured when executed to implement: a ticket controller configured to: in response to the ticket request, determine whether a ticket should be issued to the requesting entity based on the past ticket usage data of the requesting entity's profile, and if so issue a ticket to the requesting entity in electronic form via the network, a receiving module configured to receive a ticket use notification from a validating device via the network, the ticket use notification indicating: identity data of the requesting entity and identity data of a presenting entity that has presented the issued ticket to the validating device, and a profile manager configured to: compare the identity data of the presenting entity with the identity data of the requesting entity to detect whether they match, and update the past ticket usage data in the requesting entity's profile based on said detection.

A fifth aspect is directed to a computer program product comprising code stored on a computer readable storage medium and configured when executed to implement any method or system functionality disclosed herein.

BRIEF DESCRIPTION OF THE DRAWINGS

For a better understanding of the described technology and to show how the same may be carried into effect, reference is made by way of example only to the following figures in which:

FIG. 5A shows a ticket purchase transaction;

FIG. 5B shows a ticket being used by someone who originally purchased it;

FIG. 5C shows a ticket being transferred to another user;

FIG. 5D shows a ticket being used by someone who did not originally purchase it;

DETAILED DESCRIPTION OF CERTAIN INVENTIVE EMBODIMENTS

Figure 1:
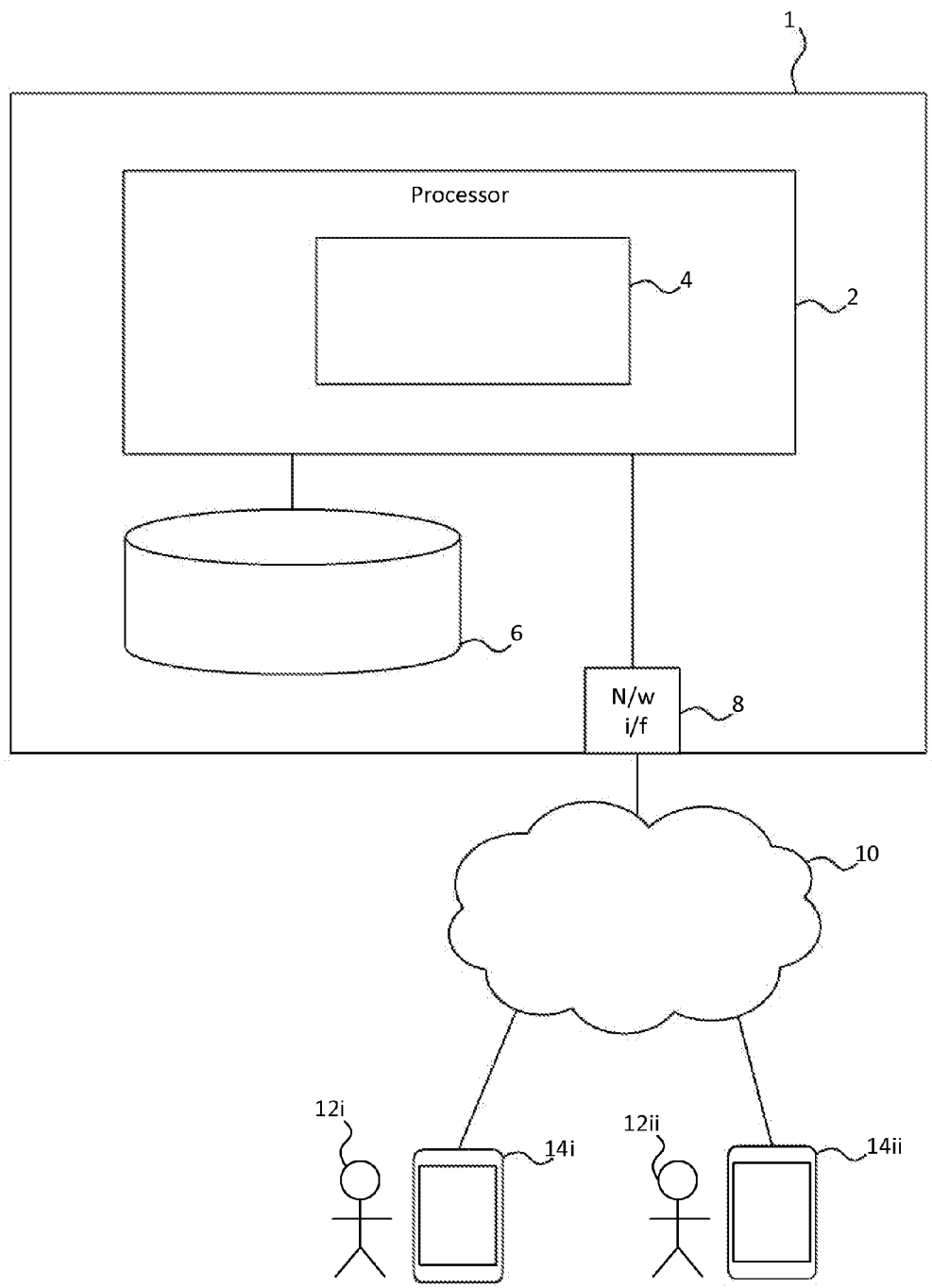
FIG. 1 shows a block diagram of a computer system for tracking an asset.

FIG. 1 shows a computer system 1 for tracking an asset. In the following example the asset is a ticket. Tickets are not normally handles as assets in conventional asset tracking systems. To date they have not been considered an asset to be tracked. One important benefit of the described technology is to provide a system which has universal application to multiple types of entities that can change their status with time.

The computer system 1 comprises at least one processor 2 executing asset tracking code 4, electronic storage 6 accessible to the processor 4, and at least one network interface 8 via which the processor 2 is connected to a network 10 such as the Internet. For example the computer system 1 may be formed of a set of one or more interconnected server devices, each configured to run at least a respective part of the code 4.

Also shown connected to the network 10 are first and second user devices 14$i$, 14$ii$ of, i.e. accessible to and operated by, first and second users 12$i$, 12$ii$ respectively, referred to as Bob 12$i$ and Alice 12$ii$ respectively. The user devices 14$i$, 14$ii$ are computer devices, for example smart devices (e.g. smartphones, tablet computers etc.), laptop or desktop computers, wearable computer devices etc. Each of the user devices 14$i$, 14$ii$ can communicate with the computer system 1 via the network 10.

Figure 2:
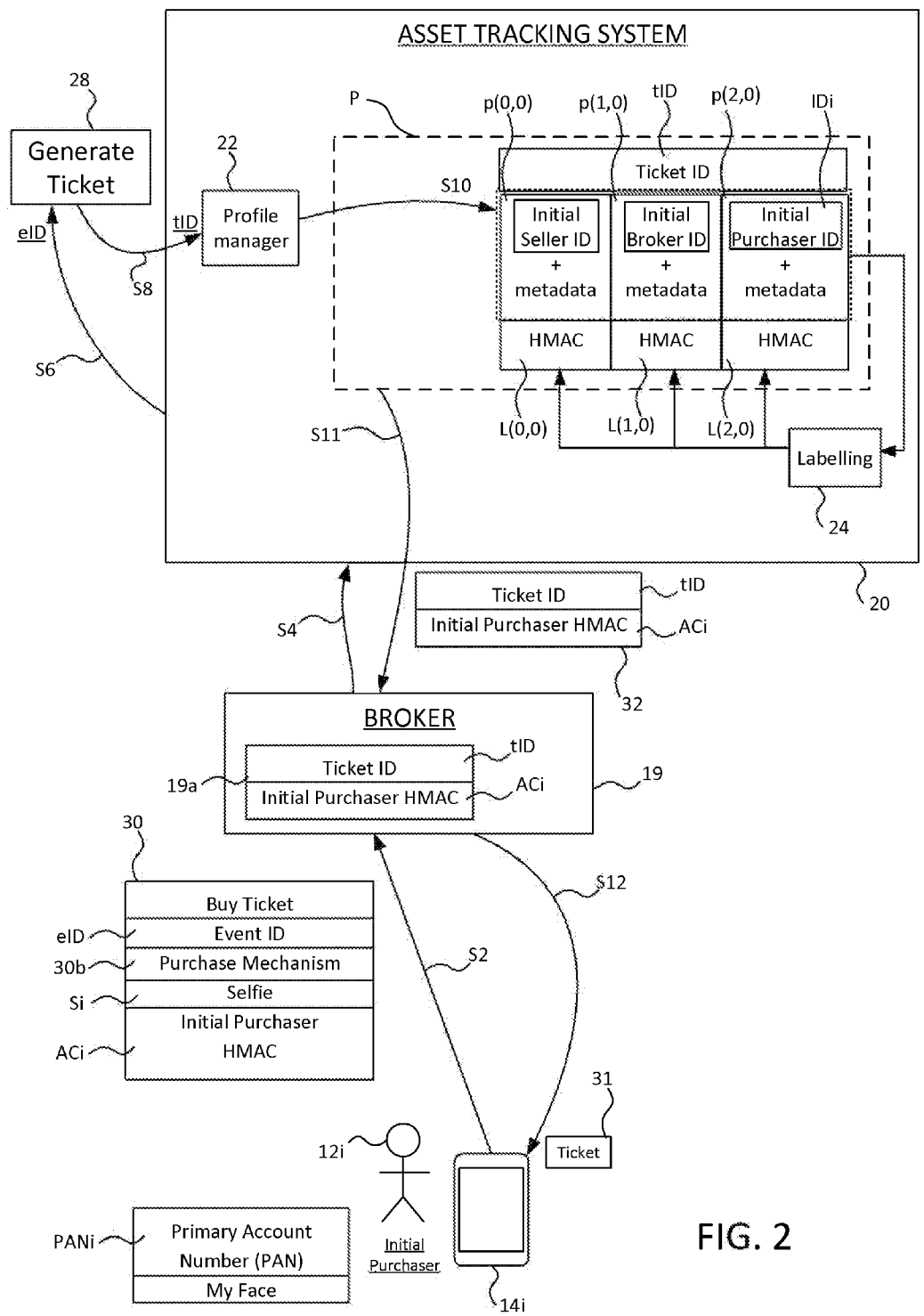
FIG. 2 shows functional modules of an asset tracking system interacting to create a set of initial profiles of an asset.
Figure 3:
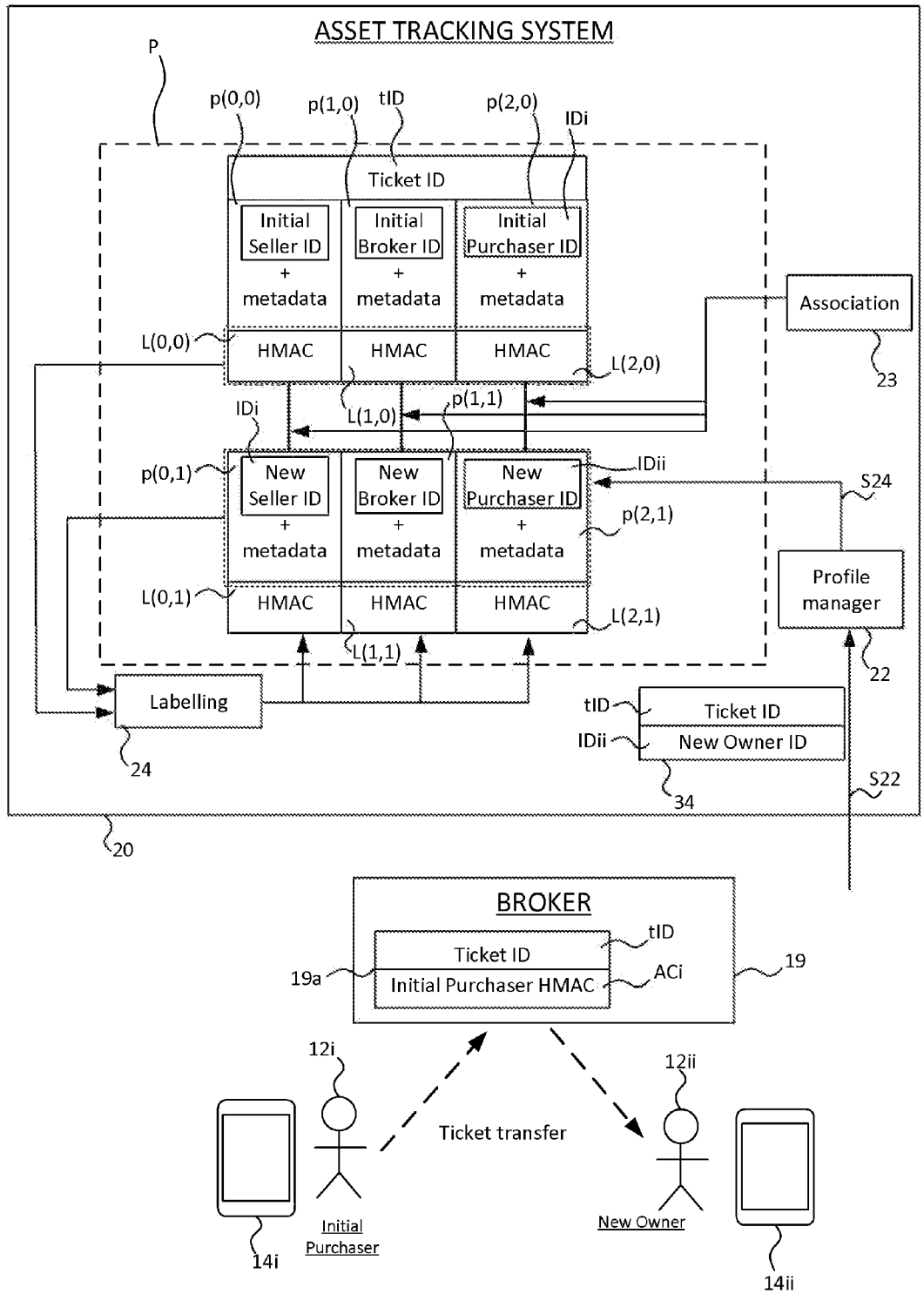
FIG. 3 shows functional modules of an asset tracking system interacting to create a new profile of an asset in response to a change of ownership.
Figure 4:
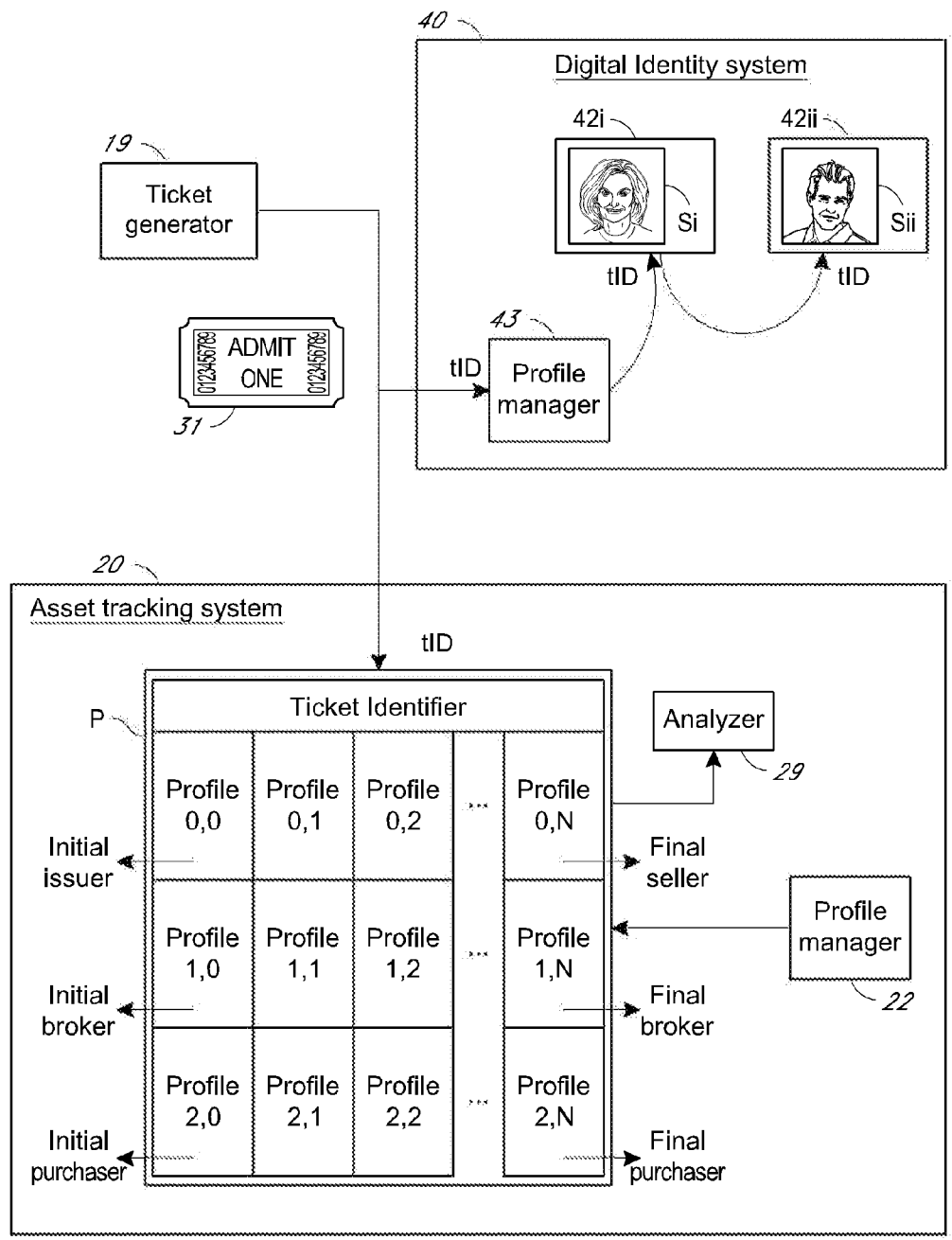
FIG. 4 illustrates a use case of a temporal sequence of profiles of a ticket.

FIGS. 2, 3 and 4 between them show the following functional modules, each representing functionality implemented by executing a respective portion of the asset tracking code 4 on the processor 2: a profile manager 22, an association module 23 a label generation module (labeller) 24, a ticket generation module 28, and an analyser 29. As explained in further detail below, the profile manager 22, association module 23 and labeller 24 interact with one another to create and manage a set P of profiles of an asset in the electronic storage 6. The profiles of the set P are all profiles of the same asset, and represent ownership of the asset at various stages of the asset's lifetime. The functional modules 22-26 and set of profiles P constitute an asset tracking system 20 implemented by the computer system 1.

By way of example, an asset in the form of a ticket to an event—such as a concert, gig, music or other festival—is considered in the following.

FIG. 2 illustrates steps of an initial asset purchase transaction, in which the ticket is initially purchased by the first user 12$i$ from a seller of the ticket such as an event organizer. The transaction is mediated by a broker computer system 19 operated by a broker. The seller may for example be a company or an individual; the same is true of the broker.

The first user 12$i$ has a payment card number, sometimes referred to as a payment account number (PAN), that has been issued to them by a bank or other card issuer. The first user's payment card number is denoted PANi. The payment card number PANi is unique, and can be used by the user to effect a transfer of funds to or from a monetary account against which the payment card has been issued, such as a debit account or credit account.

The first user's card number PANi together with their face form the basis of an identity of the first user 12$i$ within the system. As explained below, a user's face can be incorporated by way of an image captured with a camera etc.

For example, the Applicant's co-pending U.S. patent application Ser. Nos. 14/622,527, 14/622,709, 14/622,549, 14/622,737, 14/622,740—incorporated herein by reference describe a digital identity system, in which a user can, for example, create a profile of their digital identity (referred to therein as a "uPass") based on an identity document, such as a passport, and a self-captured image of their face ("selfie"). Various user profiles are referred to hereinbelow, which may in embodiments be uPass profiles.

At step S2 the first user 12$i$ uses their device 14$i$ to instigate an electronic ticket request message to the broker system 19 via the network 10. The request 30 indicates the following to the broker system 19: an event identifier eID of the event for which they are attempting to secure a least one ticket, an authentication code ACi of the first user 12$i$, and a visual image of the first user's face Si ("selfie"), e.g. as captured with a camera of their device 14$i$. For example, the request 30 may comprise one or more of these elements and/or it may comprise a link(s) to one or more of these elements i.e. data identifying a memory location at which one or more of these elements are held and from which they may be retrieved by the broker system 19. E.g. the link may be a URI.

As an particular example, the request 30 may comprise a link to a profile of the first user 12$i$ (e.g. a link to a published version of a uPass profile) that constitutes a digital identity of the first user 12$i$, and this profile may include a selfie Si previously captured by the first user 12$i$ e.g. when they created or updated the profile. For example, the profile could be a Google, Facebook or other such profile. This saves the first user 12$i$ the inconvenience of having to capture the selfie when sending the ticket request. In some cases, the request 30 may comprise a credential(s), such as a one-time pad, bound to the profile, and the relevant information may only be retrievable from the profile if the credential(s) is valid.

The authentication code ACi of the first user 12$i$ is a keyed-hash message authentication code (HMAC). A HMAC is computed based on both a cryptographic hash function and a cryptographic key, and when applied properly can be used both to integrity protect data, i.e. to enable an check as to whether the data has been altered, and to authenticate the data, e.g. to demonstrate that an originator of the data is who he, she or it claims to be, the originator being the first user 12$i$ in this example. A HMAC is defined in RFC 2140 "HMAC: Keyed-Hashing for Message Authentication" as:

$$HMAC(K,d) = H([K\ XOR\ \text{opad}] \| H([K\ OR\ \text{ipad}] \| d)) \qquad (1)$$

in which K is a cryptographic key; d is the data to which the HMAC is being applied; H is a cryptographic hash function; XOR means the logical operation of bitwise exclusive-OR; and S1∥S2 means a concatenation of strings S1 and S2. In equation (1), opad and ipad are outer and inner padding bits, defined in RFC 2014 as B repetitions of the bytes 0x5c and 0x36 respectively where H is configured to operate on data blocks of length B bytes, e.g. B=64 (though in general other set(s) of zero of more padding bits can be used).

The authentication code ACi of the first user 12$i$ is generated as ACi=HMAC (K1, PANi) i.e. by applying the HMAC function to the user's back card number PANi (or at least to a value derived therefrom) with key K1. This operation is irreversible in the sense that it is, in practical terms, impossible to ascertain the user's card number PANi from the authentication code ACi alone. The key K1 can be provided by the user 12i, or generated by the system on their behalf and provided to them. Either way, it is a shared shared between the user 12i and the asset tracking system 20. A different key K1 may be uniquely generated each time it is needed.

To provide additional security, a seed may be added e.g. so that ACi=HMAC(K1, PANi||seed).

The authentication code ACi of the first user 12i constitutes an identifier of the first user, as does their face image data as captured in the selfie Si.

The authentication code ACi of the first user 12i is used within the system to identify the first user 12i. This does not carry any security risk as, although the authentication code ACi is derived from the first user's back card number PANi, the latter cannot be derived from the former. Moreover, because every payment card number is unique, when authentication codes are generated in the same way for other user's they are guaranteed to be unique.

Note that, to this extent, the first user's card number PANi is not being used to access the monetary account against which it has been issued—rather, to this extent, its uniqueness is simply exploited to generate a unique identifier that is tied to the first user 12i. The card number PANi can be used in this way even if the ticket which the first user 12i is attempting to secure is free.

Conversely, the authentication code ACi cannot be used to access the first user's monetary account against which the card number PANi is issued. Thus in the case that payment is required for the ticket, the necessary payment card details 30b must also be included in the request 30 in a form suitable for whatever purchase mechanism is being used to transfer the appropriate funds to the broker in the conventional manner.

It is not essential for the authentication code ACi to be generated at the first user device 12i, though it is preferable from a security perspective.

At step S4, in response to the request 30, the broker system 19 instigates a ticket query to the asset tracking system 20, to query whether the first user's request 12i can be accommodated. For example, where the first user 12i has requested a number of tickets (one or more), the broker system 19 may query whether that number of tickets is available. Step S4 may be conditional on one or more criteria assessed by the broker system 19; for example, the broker system 19 may refuse the request if more than a maximum permitted number of tickets is requested. In response to the query, the asset tracking system 20 instigates (S6) a ticket identifier (ID) request to the ticket generation module 28. The ticket ID request identifies the event, for example by comprising the event identifier eID, and requests one or more tickets to the event as appropriate.

Assuming the request can be accommodated, e.g. as may be the case if the event has not yet reached capacity, the ticket generation module responds (S8) to the ticket ID request from the asset tracking system 20 with a unique ticket identifier tID for each requested ticket. A respective profile sequence is created in the tracking system 20 for each ticket identifier. In the following example, it is assumed that only one ticket is requested; where multiple tickets are requested, the relevant steps can performed for each requested ticket as will be apparent.

The ticket ID may for example be generated as a combination (e.g. concatenation or convolution) of a vendor identifier and a randomized sequence, for example a random number in a fixed field. The ticket number is unique and may be large, e.g. it may be a GUID, CSPRNG etc. It may be a prime number (or the randomized sequence may be prime). Alternatively, it may be entirely randomized.

Note where a ticket identifier is used as a device ID (see below), it is the randomised part that is used alone and not the vendor ID part.

The ticket identifier tID is supplied to the profile manager 22, and in response the profile manager 22 instigates the creation of the set of profiles P in the electronic storage.

When first created, the set P is made up of three initial profiles of the asset: an initial sale profile p(0,0), an initial asset brokering profile p(1,0), an initial purchase profile p(2,0). Each initial profile is associated with the ticket identifier tID in the storage 6.

The initial sale profile p(0,0) records the initial sale of the asset by the seller. It comprises an identifier of the seller (e.g. event organizer) and metadata, such as a location of the seller, time of the transfer, device metadata (e.g. device ID) of a device used by the seller to conduct the sale. For example, the profile p(0,0) may comprise a link to a profile of the seller themselves, that includes details of the seller, e.g. company details or details of an individual seller as applicable.

The broker profile p(1,0) records the fact that the initial sale has been brokered by a third party (the broker). It comprises an identifier of the broker and metadata, such as a location of the broker, time of the transfer, device metadata (e.g. device ID) of the device of the broker system 19 that brokers the sale. For example, the profile p(1,0) may comprise a link to a profile of the broker, akin to that of the seller.

The initial purchase profile p(2,0) comprises an identifier IDi of the first user 12i, and thereby identifies the first user 12i as the first purchaser of the ticket. The profile p(2,0) also comprises metadata, such as a location of the purchaser, time of the transfer, metadata (e.g. device ID) if the purchaser's device 14i.

The identifier IDi of the first user 12i comprises at least one of:
  the authentication code ACi of the first user 12i;
  the first user's selfie Si, or a link to the selfie Si;
  a link to identity data of the first user 12i stored elsewhere, such as a link to a profile of the first user 12i (e.g. a link to a published version of a uPass profile of the first user 12i, published as part of a uPass transaction in which the ticket is purchased).

Preferably it comprises both the authentication code ACi of the first user 12i, and the selfie Si or a link to the selfie Si.

The labeller 24 also generates a respective label L(0,0), L(1,0), L(2,0) for each of the profiles p(0,0), p(1,0), p(2,0). The labels L(0,0), L(1,0), L(2,0) are also HMACs, and may for example be generated by applying the HMAC function of equation (1) to data of the profiles p(0,0), p(1,0) and p(2,0) respectively. Once generated, each label L(0,0), L(1,0), L(2,0) is attached to (i.e. associated with in the storage 6) its respective profile p(0,0), p(1,0), p(2,0).

At step S11, an answer message 32 is returned to the broker system 19 from the asset tracking system 20. The answer message 32 comprises the ticket identifier tID and the authentication code ACi of the first user 12i, thereby indicating that a ticket identified by the ticket identifier tID has been issued to that user.

At step S12, a ticket 31 is transmitted to their device 14i via the network 10 in electronic form. The ticket 31 may comprise the ticket identifier tID. Alternatively, the first user may not be granted direct access to the ticket identifier tID—in this case, a separate identifier may be used as a proxy for the ticket identifier tID instead proxy ID). For example, the first user's authentication code ACi may be used as a proxy for the ticket identifier.

Where a proxy ID is used, a mapping 19a between the proxy ID (e.g. ACi) and the ticket identifier tID is stored at the broker system 19. All access to the ticketing system 20 may be mediated by the broker in this case.

FIG. 3 illustrates steps of recording a transfer of the ticket from the first user 12i to the second user 12ii.

At step S22 a ticket transfer notification 32 is received by the profile manager 22. The ticket transfer notification 32 comprises or otherwise indicates: the ticket identifier tID, and an identifier IDii of the second user 12ii.

The identifier IDii of the second user comprises at least one of:
- an authentication code ACii of the second user 12ii, generated from a card number PANii of the second user 12ii in the same manner as the authentication code ACi of the first user 12i, but using their own key K1';
- a selfie Sii of the second user 12ii, or link to the selfie Sii;
- a link to identity data e.g. a profile of the second user 12ii.

Preferably it comprises both the authentication code ACii and the selfie Sii or a link to the selfie Sii.

The ticket transfer notification 32 also comprises identifiers of the seller, in this case Bob 12i, and a broker of the sale (which may be the same broker or a different broker, e.g. Bob himself or even Alice).

The ticket transfer notification 34 may for example be instigated by the first user 12i from their device 14i, or from the second user 12ii from their device 14ii with the permission of the first user 12i, for example as part of a uPass transaction. In either case, the transfer may be mediated by the broker system 19 as indicated in FIG. 3. When used, the mapping 19a stored at the broker system 19 may be updated to change the proxy ID e.g. to the authentication code ACii of the second user 12ii instead. Alternatively, as shown in FIG. 3, the mapping 19a may not be updated and the first authentication code ACi may continue to be used as the proxy ID. This provides an additional way of linking the initial purchase of the ticket from the original seller back to the first user 12i.

In response to the notification 34, the profile manager 22 creates three new profiles p(0,1), p(1,1), p(2,1) of the ticket. The profile p(0,1) is a new seller profile and comprises the identifier of the seller IDi (Bob in this example). The profile p(1,1) is a new broker profile and comprises the identifier of the broker. The new profile p(2,1) is anew seller profile and comprises the identifier IDii of the second user 12ii, and thereby identifies the second user 12ii as a new owner of the ticket.

The association module 23 associates each of the new profiles p(t,1)—t=0,1,2—representing the three types of profile—of the ticket with the corresponding initial purchase profile p(1,0) of the ticket, so that three ordered sequences (in the mathematical sense) of profiles (p(t,0),p(t,1)) are created with p(t,1) as the most recent purchaser profile in the relevant sequence at this point in time.

Each profile p(t,1) comprises the same type of metadata as the corresponding initial profile p(t,0), e.g. location/time of the transfer to which it relates, device metadata of device used in the transfer etc.

To do this, the association module 23 generates association data in the storage 6. For example, the label L(t,1) or other identifier of profile p(t,1) may be mapped to, i.e. associated with in the storage 6, the label L(t,0) or other identifier of profile p(t,0). As will be appreciated, this is just an example any suitable data structure can be used to associate the profiles p(t,1), p(t,0) so that they constitute an ordered sequence.

The labeller generates a labels L(t,1) for each of the new profiles p(t,1), which is attached to that new profile p(t,1).

More generally, each time such a ticket transfer notification, identifying the ticket and a new owner thereof, three new profiles p(t,n) are created. The new profile p(t,n) is associated with the next most recent profile p(t,n−1) of the same type i.e. the new seller (t=2) profile with the next most recent seller profile etc.

A label L(t,n) for the new profile p(t,n) is created. Preferably the label L(t,n) is a HMAC of data of both the new profile p(t,n) and the profile p(t,n−1) with which it is associated. For example:

$$L(t,n):=\text{HMAC}(K2,p(t,n)\|L(t,n-1)) \tag{2}$$

wherein the label L(t,n−1) of the profile p(t,n−1) is used to seed content of the profile p(t,n) before hashing. Equation to applies to all n≥1. Once generated, the label L(t,n) is then attached to the profile p(t,n).

The labels L(t,0) are L(t,0):=HMAC(K2,p(t,0)).

To provide additional security, a different key K2(l,n) may be used for each new profile p(l,n).

The sequence S is constitutes a micro-database specific to one particular ticket. A separate micro-database in maintained in this manner for every ticket that is issued (and more generally every asset that is tracked by the system 20).

An access module (not shown) implemented by the code 4 provides access to the sequence S. At least where a proxy ID is used, the access is mediated by the broker system 19.

In particular, the access module can, upon request, identify the current owner of the ticket to an entity requesting this information. The current owner is the one identified in the most recent profile in the sequence S.

Software executing on a user device may be configured to render the ticket identifier (or a proxy identifier) as a barcode, for example a matrix barcode e.g. QR code, on display of the device. A user of the user device can then present the barcode at the event itself to gain admission to the event, for example to a member of door staff. The ticket identifier is sent to the access module from a device operated by the door staff. The access module returns an identifier of the current owner—preferably a selfie from the most recent profile in the sequence S—to that device, so the door staff can check whether the user presenting the ticket is indeed the current legitimate owner of the ticket. The fact that the owner has actually shown up may be recorded in attendance data of the most recent profile of the sequence so that thereafter the last profile in the sequence not only identifies the last owner of the ticket but also records the fact that they did turn up to the event themselves. For example, this may be in response to the event owner sending an electronic message to the system 20 (e.g. via the broker system 19) from their device that the person who has turned up does indeed match the returned selfie and has thus been permitted to enter.

The last profile in each sequence is denoted p(t,N) below and in FIG. 4, the final sequence being (p(t,0), . . . , p(t,N)).

As indicated, in some embodiments, at least some of the profiles p(t,n) in each sequence may include a transfer time, indicating a time at which the asset was transferred as part of the profile metadata (see above). For example, a time at which the profile p(t,n), or the preceding/following profile p(t,n−1)/p(t,n+1), was created or a transfer time extracted from the relevant transfer notification 34.

FIG. 4 illustrates how an analysis may be performed based on one or more temporal sequences of ticket profiles P by the analyzer 29 of the asset tracking system 20. For the purpose of analysis, the analyzer 29 has access to at least one temporal sequence of profiles of a ticket 31, though preferably it has access to multiple temporal profile sequences of different tickets, and most preferably it has access to all three profile sequences (seller, broker, purchaser) for multiple tickets. The analyser 29 is configured to analyze the sequence(s) to which it has access.

The various hashing mechanisms described above provide a level of integrity protection for each chain of ownership that afford it a high level of confidence, thereby significantly strengthening any analysis of which they form a basis.

Tracking the full ownership history of each tickets in this manner across its entire lifetime also enables undesirable activity to be detected within the system. For example, to detect ticket touting. Ticket touting is the practice of acquiring a potentially large number of tickets that the tout has no intention of using personally, but is selling on usually at a premium. Increasingly, a tout may not be a user at all but may be a "bot". A bot is a software-implemented artificial intelligence deployed on a computer network such as the Internet, in this case acting as a tout i.e. programmed with a function of acquiring a potentially large number of tickets en masse as soon as they become available on the Internet, often in a very short space of time so as to deprive legitimate (i.e. non-touting) users.

To this end, an analysis of multiple profile chains may be performed by the analyzer 29 to detect an identifier of an owner that appears in multiple ones of the analyzed chains in a manner that satisfies a touting condition, indicating that the identified owner is likely to be a tout.

In this respect, the following observations have been made by the inventors:
1. Touts at best use a small number of tickets they buy, and are far more likely to transfer them on;
2. Touts rarely use tickets themselves
3. Legitimate (non-touting) users may also transfer tickets on, e.g. give or sell them to friends—but they will generally only do so to a small group of people closely related to them, whereas touts will generally sell to much larger groups of people to whom they have no personal links;
4. Touts may prefer to use anonymous brokers
5. Touts will but larger numbers of tickets than legitimate users on average A touting detection algorithm can be configured to factor in one or more of these. For example:
1. can be factored in by looking for entities that appear in multiple seller/purchaser sequences, but always transfer tickets on
2. can be factored in by looking at actual attendance data (see below)
3. can be factored in by including a network analysis, i.e. spotting touts based on the size of the network of users in which their tickets are spread
4. can be factored in by looking at the broker chains
5. can be factored in by counting how many times the same entity appears across different profile sequences A particular advantage of maintaining three full profile chains (seller, broker, purchaser) is that it provides a sufficient depth of information for a suitably configured touting analysis algorithm to reliably spot touting behaviour, as it indicates who is selling to whom, and in what manner (the latter indicated by the broker chain).

FIG. 4 also shows a digital identity system 40. Profiles 42*i*, 42*ii* of the first and second users 12*i*, 12*ii* in the digital identity system 40 are shown, each profile 42*i*, 42*ii* comprising that user's respective selfie Si, Sii, or a link to that user's selfie Si, Sii. As indicated, an individual profile of a ticket may identify an owner of the ticket by a link to the relevant profile 42*i*, 42*ii* in the digital identity system 40. A profile 42*i*, 42*ii* may be specific to an event (or group of events e.g. related events), so that there is one profile per user per event (or event group); accords multiple events, the profiles for these events may be grouped together into an event profile group. Alternatively, a user may have a ticket buying profile 42*i*, 42*ii*, which the use to purchase and record ownership of all of their tickets. Alternatively the user could even have one profile 42*i*, 42*ii* per ticket, though this is less preferred. Alternatively, though this is also less preferred, the user could have one general purpose profile 42*i*, 42*ii* that is not specific to events or tickets.

The profiles 42*i*, 42*ii* may be uPass anonymous profiles, i.e. so that the only user identity data they contain is the selfie Si, Sii (no name, address, date of birth etc.).

The digital identity system comprises its own profile manager 43 for managing user profiles 42*i*, 42*ii*.

When the ticket identifier is first generated:
within the digital identity system 40 the profile manager 43 associates it with the profile 42*i* of the initial processor;
within the asset tracking system, the three initial profiles p(0,0), p(0,1), p(02,) are created.

When a transfer of the ticket takes place:
within the digital identity system, the profile manager 43 "moves" the ticket identifier from the current owner's profile 42*i* to the new owner profile 42*ii*, by disassociating it from the former and associating it with the latter;
within the asset tracking system 20, three new profiles p(0,n+1), p(1,n+1) and p(2,n+1) are generated and associated within p(0,n), p(1,n) and p(2,n) respectively to create the seller, broker and purchaser chains respectively.

Figure 4A:
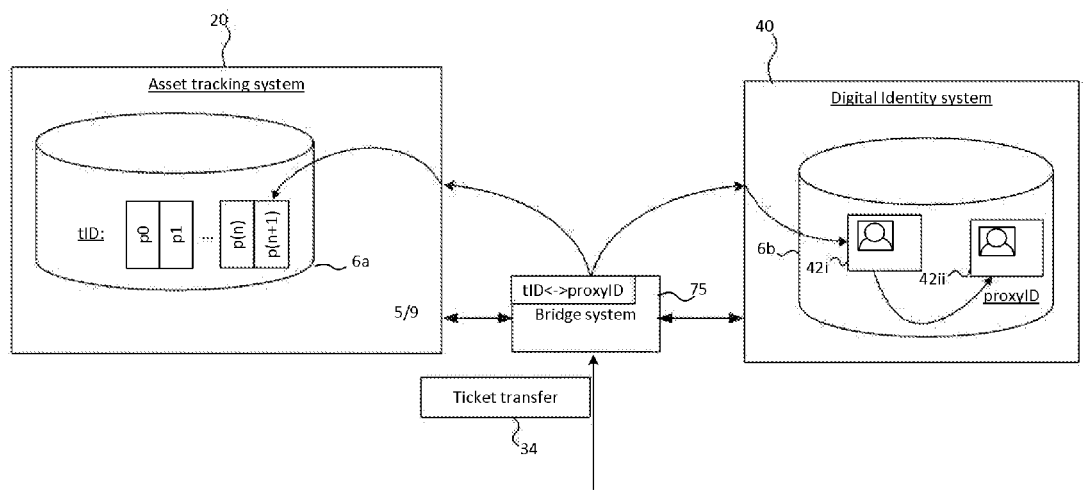
FIG. 4A shows an asset tracking system and digital identity system responding to the same asset transfer.
Figure 4B:
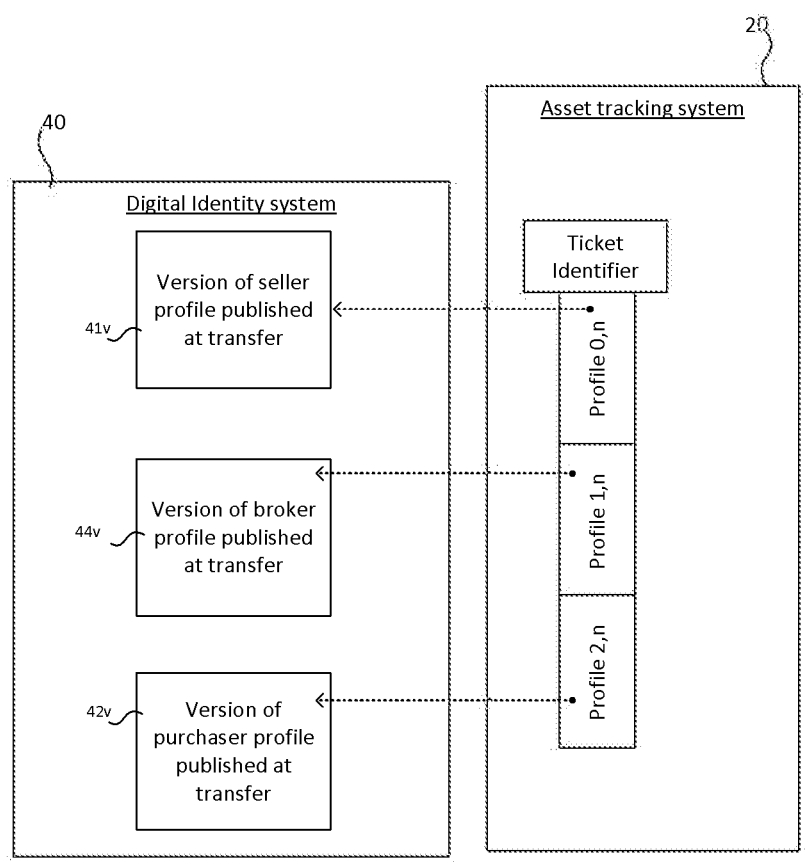
FIG. 4B shows a relationship between profiles of an asset and profiles in a digital identity system.

As shown in FIG. 4B, each of the asset profiles p(0,n), p(1,n), p(2,n) relate to the same asset transfer, and may comprise a link to a published versions 41*v*, 44*v*, 42*v* of a seller profile, broker profile and purchaser profile in the digital identify system 40—see FIG. 4B. These published versions may be immutable, to as to provide a snapshot of the identities expressed by the seller, broker and purchaser within the digital identity system 40 at the time the asset transfer took place.

Thus as multiple asset transfers take place, within the asset tracking system the transfer chains get longer whereas the asset moves about between profiles within the digital identity system.

Interactions between the asset tracking system 20 and the digital identity system 40 are via a bridge system 75, which is not shown in FIG. 4 but is shown in FIG. 4A. FIG. 4A shows an alternative view of some of the interactions of FIG. 4. The bridge system 75 may be an event system, operated by on or behalf of the event organizer or multiple event organizers, which includes the ticket generator 19. The electronic storage accessible to the asset tracking system 20 is denoted 6*a* and the electronic storage accessible to the digital identify system is labelled 6*b*.

Note: within the digital identity system 40, the ticket identifier tID may not be used directly—a proxy ID may be used instead (similar to the proxy ID used by users 12*i*, 12*ii*—see above). In this case, the bridge system 75 stores an association "tID<->proxyID" between the proxy ID used in the digital identity system 40 and the ticket identifier tID used in the asset tracking system 20. For example, this may be particularly suitable is the ticket identifier is not globally unique, as it can be mapped to a globally unique proxy ID used in the digital identity system 40. This is particularly appropriate where the proxy ID is treated as a device identifier in the digital identity system 40 (see below).

It will be understood that all description material pertaining to the ticket identifier tID in the context of the digital identity system 40 applies equally to a proxy identifier when that is used instead.

Alternatively the same ticket identifier tID may be used in both systems 20, 40.

User profiles 42i, 42ii in the digital identity system 40 may be modified based on the analysis performed by the analyzer 29. For example, a profile in the digital identity system 40 may be associated with what is referred to herein as an anti-touting metric, indicating a probability that the user is a tout, which may be updated based on the results of a tout detection analysis by the analyzer 29.

This anti-touting metric may, for example, be used at step S4 and/or step S6 as described above, and the relevant method steps may be conditional on the outcome.

For example, when the first user 12i requests a ticket at step S2, the broker system 19 may have a link to the first user's profile 42i provided by the user in the request 30. The broker system 19 can request the anti-touting metric—"ATM" in the FIGS. 5A-5D—associated with the user's profile metric via an API, in response to which a metric generator 76 of the digital identify system generates it based on past ticket usage data "UD" e.g. accessed from the profile sequences P in the asset tracking system 20. The broker system 19 may refuse the request if the anti-touting metric indicates a high probability of the first user 12i being a tout—for example, if it is above a threshold. The broker is free to set the threshold wherever they (or the ticket seller) choose. For example the broker may decide to impose stringent conditions (i.e. a low probability threshold) for very popular events, rejecting requests if there is even a small probability that the request has originated with a tout. For unpopular events, the broker may be more relaxed about or even completely tolerant of touting—that is entirely their choice; the present mechanism allows them to make an informed choice.

Alternatively, or in addition, an equivalent check of the first user's anti-touting metric associated with their linked-to profile 42i may be made by the ticket generator 28. In this case, the issuance of the ticket identifier on an equivalent criteria set by the ticket generator 28. The ticket generator 28 may be operated by the seller rather than the broker, so that the seller is free to set their own anti-touting criteria independently of the broker.

The anti-touting metric may for example comprise a ratio Nu/Na—or more generally a suitable function—of the total number of tickets a user has bought Na (indicated by the initial purchaser profile p(2,0) of the relevant sequences) to the total number of events that have actually shown up at Nu (as indicated by attendance data in the final profiles p(2,N) of the relevant sequences. Alternatively or additionally, the metric may comprise ratio of the number initial purchaser profiles p(2,0) that identify the user to the number of final profiles p(2,N) that identify the user across multiple sequences, if actual attendance is less of a concern. The ratio of function may be biased in the user's favour to begin with, so that they cannot be labelled as a tout immediately. As a simple example, Nu and Na may have non-zero values initially, e.g. they may be both set to 50 so that over time the ratio becomes 51/51 (shows up) or 50/51 (doesn't show up) etc. More generally, the system 1 is configured as a learning system, which assumes that entities are not touts to being with and learns from any touting behaviour they exhibit over time.

Alternatively or additionally, the metric may be based on, say, an average or other indicative amount of time for which the user retains tickets, based on the asset transfer times in the profiles of the analyzed sequence(s).

Note: in this context the actions user 12i could equally performed by a bot, and they system may even permit this to a controlled extent. The analyzer 29 may be configured to detect whether or not this is the case, i.e. whether an asset requesting entity is a human or a bot. The bot may also have an identity, for example a profile(s), within the digital identity system 40. The analyser may insert information into this profile which flags the profile as being of an entity that is a bot, rather than a human.

Use of the asset tracking system 20 by an entity, such as the first user 12i, 12ii, may be conditional on that entity setting up a digital identity system 40. That is, use of the digital identity system 40 may be mandated if a transfer is to be recorded using the asset tracking system 20, such that a link to a profile in the digital identity system 40 is required to do so.

Within the asset tracking system 20, the ticket 31 has an identity in the sense that it has profiles of its own. In one sense, the asset tracking system 20 can be regarded as a separate digital identity system but for assets.

Within the digital identity system 40, the ticket may by contrast be treated as a virtual device, with the ticket identifier tID or another ticket identifier of the ticket 31 being treated as a device identifier within the digital identity system 40.

The digital identity system 40 may, for example, be implemented as a uPass system (see co-pending applications, above). Indeed, in some cases, the asset tracking system 20 and the digital identity system 40 may be implemented as separate and largely independent uPass systems or identity spaces. In this case, within the asset tracking identity space 20, the uPass "entities" are assets. Within the uPass identity space 40, the uPass entities are humans, e.g. users 12i, 12ii, bots etc., and assets are treated at least to some extent as devices.

For a uPass system, links to profiles are in the form of links to published versions of profiles. The terminology "a link to a profile" encompasses a link to a published version of a uPass profile, and does not have to be a direct link to the underlying master profile from which it has been published.

Advantageously, the architecture of the uPass system 40 can be readily adapted to provide a robust anti-touting mechanism that requires little or no manual oversight, and does not curtail legitimate activity by non-touting users unnecessarily.

This is in contrast to existing anti-touting methodologies that are somewhat crude, and often end up curtailing what most would perceive as reasonable activity by legitimate users, such as purchases on behalf of, and a certain amount of re-selling to, genuine friends and family. Moreover existing methodologies tend to involve a significant level of manual oversight.

For example, one existing methodology involves restricting the number of tickets that can be bought on any given credit or debit card, and/or that can be dispatched to any given address (e.g. email or postal). This tends to be enforced by a ticket provider simply revoking tickets, after they have already been issued, should those tickets later turn out to have been issued in violation of these limits. This generally requires at least a degree of manual oversight in ultimately deciding whether or not an already-issued tickets should or should not be revoked. Moreover, it can be unduly restrictive: for example, occasionally a user may wish to buy tickets for a large group of genuine friends with whom they wish to attend the event, which in some cases an event owner may wish to permit. Additionally, for less popular events, such restrictions may be unwanted: for example, an event may be over-targeted by touts i.e. by touts buying up tickets for which there is in fact limited demand so that they are never in fact able to sell them on. This can lead to an event not only selling out, depriving those who genuinely do wish to attend the event—but are (justifiably) unwilling to buy a ticket from a tout—of the opportunity to attend, but also being poorly attended due to the touts' unsold tickets being essentially wasted. From the perspective of a tout, this may amount to an acceptable loss in the context of their wider activities, whereas for an event organizer the effect can be detrimental both to the event itself in the short term and their reputation in the long term.

Problems also arise if less than the expected number of attendees turn up: significant revenues are generated from attendance, car parking, bad drops, food, drinks, merchandise etc. Moreover, ticket increase does not reach the owner or venue either.

Another example of an existing methodology is deterring touts by restricting or even forbidding the transfer of issued tickets between entities. This has been enforced by, for example, requiring ticket holder to present the card they used to purchase their ticket(s) to gain admission to a ticketed event. Notionally, this mandates at least the purchaser of a ticket or group of tickets to attend the event in person. However this again relies on manual oversight by those managing the event, and at a busy event such checks will often end up being neglected. Thus, in practice a warning that a purchasing card is required for admittance may amount to little more than a hollow and ineffective threat. Moreover, there can be legitimate reasons why an entity may occasionally wish to transfer a ticket they have purchased, for example where they purchased it with the intention of attending but are prevented from doing so by unforeseen circumstances, or where they have purchased it on behalf of a genuine friend who for whatever reason was unable to purchase it themselves. Thus such tout deterrents may be not only ineffective but also impose an unnecessary burden on legitimate users. Moreover, even where ID is mandated, this is rarely enforced in practice as discussed. Major events e.g. the world cup state they require photo ID, passports etc. to be brought to the venues but in reality they are not checked due to the impact on processing speed. In contrast, the digital profiles of the described technology provide a much more viable identity check mentalism.

Embodiments provide a solution to the problem of tout detection by tying both ticket purchase and ticket use to an entity's digital identity within the uPass system 40 across multiple events. In so doing, it becomes possible to track the ticket-related activity of entities within the system, and in particular to detect those entities who are frequently purchasing tickets within the system but never or rarely showing up to the events themselves.

Actions within a uPass system 40 can be effected by uPass transactions, in which a validation service 14b validates the appropriate uPass credentials.

In some implementations, the mechanism by which the ticket 31 is purchased by the first user 12i (referred to as "Bob" below) is a uPass transition. This will now be described with reference to FIG. 5A.

FIG. 5A shows Bob buying a ticket from the seller via the broker system 19. To do this, Bob presents (S3a) a credential 52i, that is bound to his uPass profile 42i, to the broker system 19. For example the credential 52i may be part of the ticket request 30.

The broker system 19 receives the credential 52i. At this point the broker does not know whether or not it is willing to sell a ticket to Bob as it has not seen Bob's profile. Therefore the broker system 19 sends (S3b) Bob's credential 52i, together with its own credential 54 to the validation service 14b. The broker's credential may also be bound to a uPass profile of the broker 44 in the uPass system 40. Assuming the credentials 52i, 54 are valid, the validation service 14b causes a first receipt 64 to be sent to the broker system 19 (S3c). The first receipt 64 contains a link to a published version of Bob's profile 42i.v1. In this scenario, the ticket is issued only if the uPass credentials are valid.

Bob's profile 34B is associated with past ticket usage data UD, indicating the extent to which he has used (rather than e.g. sold on) in the past. This past ticket usage data comes from the ticket profile sequences in the asset tracking system 20, which in turn link to published versions of his profile 42i for transactions he has participated in.

A comparison module (functional module) in the form of a metric generator 76 is shown, which generates an anti-touting metric ATM based on the past usage data UD. This is generated upon request by the broker system 19 via an API of the system 40, and the requested anti-touting metric ATM is supplied to the broker system 19 via the API.

The metric generator 76 may be implemented in either of the systems 20, 40, and may for example represent part of the functionality of the analyzer 29 of FIG. 29.

Details of the anti-touting metric ATM will be described in due course. Suffice it to say, in this example, the anti-touting metric UD indicates a probability that Bob is not a tout i.e. a probability that, if the broker were to issue a ticket or tickets to Bob, Bob will actually use one of these tickets himself rather than, say, selling them all on. In this example the probability that Bob is not a tout is 80%, which is high enough for the broker to accept Bob's request and issue him with the requested ticket(s). Each ticket comprises a ticket identifier or proxy identifier of the kind discussed above, labelled tID in the various figures.

In the following examples, the ticket identifier tID is issued to Bob directly. As will be apparent, the same steps apply when a proxy identifier is used instead, and in this case all interactions with the asset tracking system are via the broker system 19 which translates the proxy identifier to the ticket identifier tID used within the asset tracking system 20.

A less preferred alternative is that Bob's profile 42i contains the anti-touting metric UD.

Within the uPass system 40, the ticket identifier is then associated (enrolled) with Bob's profile 42i in a manner that will be described later. Once this association has been created, Bob (or more accurately Bob's profile 42i) is effectively registered within the uPass system 40 as the owner of the ticket. Note this is a separate mechanism from that used to record ownership changes within the asset tracking system 20.

In this example, the instigation of the ticket query at step S4 from the broker system 19 to the asset tracking system 20 is conditional on Bob's anti-touting metric ATM being determined by the broker system 19 to meet anti-touting criteria set by the broker.

Bob also gets a receipt 62*i*, and Bob and the seller each get a fresh credential.

Note: the outcome of FIG. 5A could also be achieved by the Broker system 19 presenting its credential 54 to Bob (e.g. as a QR code which Bob scans with his device 14*i*), and Bob's device sending the two credentials 52*i*, 54 to the validation service 14*b*.

FIG. 5B shows a situation where Bob actually turns up at the ticketed event himself. To gain admission to the event, Bob presents the ticket identifier tID to a validating device 46 being operated e.g. by a member of event staff such as a door supervisor (S26). In turn, the validating device transmits a ticket use notification 72 to the asset tracking system 20. The notification 72 comprises the ticket identifier tID. In response, the door supervisor is granted access to the most recent profile in the sequence of profiles P of the ticket in the asset tracking space 20—the original purchaser profile p(2, 0) in this example—and can thus see who the current ticket owner is. In this example, the current ticket owner is indeed Bob so the door supervisor should allow him into the event.

Attendance data AD in the most recent profile p(2,0) is updated to indicate that the ticket owner identified in the profile p(2,0) has attended the event. In some cases, this may be conditional on the door supervisor notifying the asset tracking system 20 from their device 46 that is the true current owner of the ticket that has actually shown up (S30). E.g. an automated feedback mechanism may present them with a simple "yes/no" selectable option on their device 46, so that the effort involved in providing feedback is minimal.

An alternative to adding the attendance data to the profile p(2,N) is adding attendance data to the sequence, in the form of a terminating P(t,N+1) profile that is added to each of the t=0,1,2 chains to indicate that ticket has been used. These profiles P(t,N+1) may transfer the ticket back to the original owner (i.e. the event organizer). Both types of attendance data are examples of past ticket usage data.

The metric generator 76 of the uPass system 40 detects whether an original purchaser of a ticket to whom the ticket is initially issued is the same person as a presenter of the issued ticket i.e. a human entity who is presenting a ticket to an event manager (e.g. a volunteer or member of event staff who is "on the door" at the event venue) in an attempt to gain admission to the event to which it relates. The presenter and the buyer may be the same person, or the presenter may be a different person to whom the ticket has been legitimately transferred.

The metric generator 76 uses the sequence of profiles P of the ticket in the asset tracking system 20 to compare identity data of the original ticket purchaser 12*i* (i.e. Bob) with corresponding identity data of the ticket presenter (i.e. the person who has actually shown up at the ticketed event, which may or may not be Bob). The identity data may for example comprise HMACs of a card number or part of a card number issued to the relevant entity. For example, the metric generator 76 may detect whether identity data of the initial purchaser as indicated by profile p(2,0) of the ticket in the sequence P matches corresponding identity data of the user indicated by attendance data AD in a profile of the sequence P to have actually shown up at the event. Note "corresponding" means the sets of identity data of the same type i.e. comparing like-for-like.

Alternatively or additionally, the identity data may comprise a unique string (e.g. numerical string, alphanumerical string, bit string etc.) provided by or allocated to Bob, that constitutes a shared secret. The unique string may be communicated to the validating device 76 wirelessly, e.g. via an NFC link or as a displayed barcode (e.g. QR) code, and transmitted from the validating device to the system 20 and stored so that it is accessible to the metric generator 76 when needed.

A profile p of the ticket in the asset tracking space may indicate identity data of an entity because it comprises that identity data, or because it comprises a link to a uPass profile of that entity from which that identity data can be retrieved (for example).

In the example of FIG. 5B, in response to Bob showing up himself, the past ticket usage data in the ticket relevant ticket profile(s) stored in the asset tracking system 20 is updated in a manner that, thereafter, the metric generator generates a more favourable metric ATM for Bob's.

By contrast, FIG. 5C shows an example situation in which Bob sells or otherwise transfers his ticket to the second user 12*ii* (referred to as "Alice" below). This can be also be achieved by a uPass transaction.

Bob presents a credential 52*i'* to Alice's device 14*ii* (S21), and Alice transmits Bob's credential 52*i'* along with her own credential 52*iia* and the ticket identifier tID to the uPass system 40. Alternatively the signalling flow may be reversed i.e. Alice presents her credential 52*iia* to Bob's device 14*i*, which transmits it with Bob's credential and the ticket identifier tID to the uPass system 40. Within the uPass system 40, the ticket identifier tID becomes enrolled with Alice's profile 42*ii* in response. This is entirely legitimate—the system allows for transfer of tickets, and Alice is now recorded as the rightful owner of the ticket within the uPass system 40. Alice and Bob each get a receipt linking to the other's profile and a fresh credential.

Again, this is separate from the ownership tracking mechanism of the asset tracking system 20.

To enable tracking within the asset tracking system 20, the asset transfer notification 34 is sent from Alice to Bob's device (possibly via the broker system 19) to the asset tracking system 20, where a new profile p(2,1) is added to the sequence of profiles P of the ticket identifying Alice as the new owner in the manner discussed.

FIG. 5D shows Alice using the ticket, which she now rightfully owns, to gain admission to the event. From the perspective of Alice and the door supervisor, the process proceeds in exactly the same way as FIG. 5B, by Alice presenting the ticket identifier to the door manager's device 52M (S28). Alice is identified to the door supervisor based on p(2,1). Attendance data is included in the most recent profile p(2,1) to indicate that the owner identified by p(2, 1)—in this case Alice—has actually attended the event. The attended data in p(2,1) is associated with Bob's profile 42*i* by virtue of the fact that p(2,0) in the same sequence of profiles (and thus associated with the same ticket identifier) links to a published version of Bob's profile 42*i*.

In this instance, thereafter, this causes the metric generator 76 to detect 'behind the scenes' that the person who has shown up to the event (Alice) is not the entity who purchased the ticket. Thus in future it will generate a metric ATM that is less favourable to Bob on the basis that he is more likely to be a tout because he has transferred his ticket to Alice and Alice has used it.

Each time this happens, the past ticket usage data UD used to generate Bob's anti-touting metric ATM will be updated accordingly. If Bob frequently buys tickets but never uses them, there may come a point where his anti-touting metric UD is so unfavourable that sellers may choose not to sell to him in the future, or may place restrictions on what tickets he can buy. Again that is their choice—but the digital identity system provides a means by which they can make informed choices.

The past ticket usage data UD thus indicates a probability that the buyer would personally use a ticket issued to them based on a history of past ticket usage.

The metric ATM may comprise e.g. a ratio of the number of times the buyer has bought tickets to events to the number of times the buyer has actually shown up at any of those events, shown as a percentage in the figures by way of example. This is just an example and the past ticket usage data US can take a number of different forms, such as other functions of these numerical measures.

A uPass profiles 42i, 42ii is published by storing a version of it to addressable memory location. The link to that version of the profile identifies that location.

The broker's receipt 64 comprises a link to the published version of the buyer's (i.e. Bob's) profile. In turn, the published version of Bob's profile comprises a current version of the anti-touting metric UD, which the broker system 19 can access by following the link. The broker system 19 can then decide whether to issue ticket to the buyer based on the metric UD, for example based on a threshold. This may be entirely automatic.

For instance, where the probability of the buyer being a tout (as indicated by the metric UD) is below a threshold, the ticket request may be approved by the broker system 19 whereas if that probability is above the threshold it may be refused. Alternatively, where the probability is above the threshold and a plural number of tickets have been requested, the ticket issuer may only permit a number of tickets that is less than the number requested to be issued (e.g. only one ticket).

The behaviour of the broker system 19 can be agreed with the organizer of an event, who is the ticket seller in this context. Subject to any agreement with the seller, the broker is free to program their system 19 as they see fit. For example, they are free to set and vary the threshold, or to change how the controller responds when the probability is above or below the threshold. This gives the event organizer the freedom to, say, implement strict anti-touting criteria (low threshold and/or strict refusal of tickets to any entity identified as a tout) for a popular event, but less stringent or even no ant-touting criteria for an unpopular event.

If a ticket request is approved, the broker system 19 issues a ticket (or however many tickets have been approved) to the buyer's device 14i in electronic form e.g. via the internet. The ticket comprises the ticket identifier (labelled tID in the figures).

The ticket identifier is, in turn, associated with the buyer's uPass profile 42i in the uPass system 40. This can be achieved using the same enrolment mechanism used to enroll a new device within the uPass system 40. The buyer's device 14i submits the ticket identifier to an account service 45 of the uPass system, in the same way it would a device identifier of a new device that the buyer 12i wishes to enroll based on the existing enrolment of their current device 12B. The account service 45 is implemented by the uPass profile manager 43, though this is not shown explicitly. Within the uPass system 40, the ticket is realized as a virtual device hosted on the buyer's device 14i, with the ticket identifier constituting a device identifier of the ticket virtual device. Subject to successful enrolment, a credential is issued to the ticket virtual device and sent to the buyer's (physical) device 14i hosting the ticket virtual device. Within the digital identity system, this credential is bound to both the buyer's profile 42i and to the ticket virtual device in the manner discussed, and thus this enrolment process acts to associate the buyer's profile 42i with the ticket identifier. This is similar to creating virtual devices on servers (see above). Where a proxy identifier is used, it may be enrolled in place of the ticket identifier.

When a change of ticket ownership takes place, that is recorded in the uPass system 40 (separately from the asset tracking system 20) by disassociating the ticket identifier from the previous owners profile 42i, and reenrolling it as a device bound to the new purchaser's profile 42ii. In this manner, the new owner is recorded as the now true owner of the ticket in the uPass system 40.

All description material pertaining to "device identifiers" herein applies equally to ticket identifiers when enrolled in this manner as virtual devices. For example, where a credential is bound to (i.e. associated with, in the digital identity system) a profile and a ticket identifier, and that credential is presented in a uPass transaction, that transaction may only be permitted to complete if the credential is both valid and presented with a matching ticket identifier (just as is the case for credentials bound to physical devices with physical device identifiers).

In this context, the account service 49 constitutes an association module for associating ticket identifiers with uPass profiles.

The ticket identifier may for example be associated, in a database of the digital identity system, with a network address of the buyer's physical device 14i hosting the ticket virtual device. The uPass system 40, separately from the asset tracking system 20, may record transfers of the ticket virtual device to a different physical device by changing the network address associated with it in the database, for example to a network address of Alice's device 12ii when the ticket is transferred from Bob to her.

The credential bound to the buyer's profile and the ticket identifier may also be associated with the ticket identifier and the buyer's profile in a database of the digital identity system, for example by storing the credential or preferably the ingredients for generating this credential in association with these two elements in the database.

The buyer's receipt 62i comprises a link to the published version of the broker's profile 44, so that the buyer can also verify that the broker is legitimate. For example, the broker's profile 44 may include an identifier (e.g. logo, trademark etc.) of the ticket seller and/or broker and be allocated a high confidence value, indicating that within the digital identity system there is a high confidence that the seller is who they say they are. Final purchase of the ticket may, in some cases, only proceed once the user has been given the opportunity to review the seller's profile and decide whether or not they do indeed wish to proceed based thereon.

Once a ticket has been issued, the buyer is free at least to some extent to pass it on to other entities registered with the digital identity system, for example as a gift or re-sale. Some restrictions may be placed on this, for example restricting the re-sale price, though this is not in fact necessary—rather, the focus of the present anti-touting mechanism is not on preventing movement of issued tickets, but rather on monitoring this movement over time and making a future decision about whether to issue another ticket to the buyer in the future based on this monitoring. This monitoring is recorded by updating the anti-touting metric in the buyer's profile 42i.

When a legitimate ticket transfer takes place from the buyer to a different entity, within the uPass system 40 this is recorded by a uPass transaction, which in this case causes the ticket identifier to be associated with a profile of the new entity instead. For example, the ticket identifier may be re-enrolled as a virtual device, this time as a device of the different entity using the same enrolment mechanism.

Figure 6:
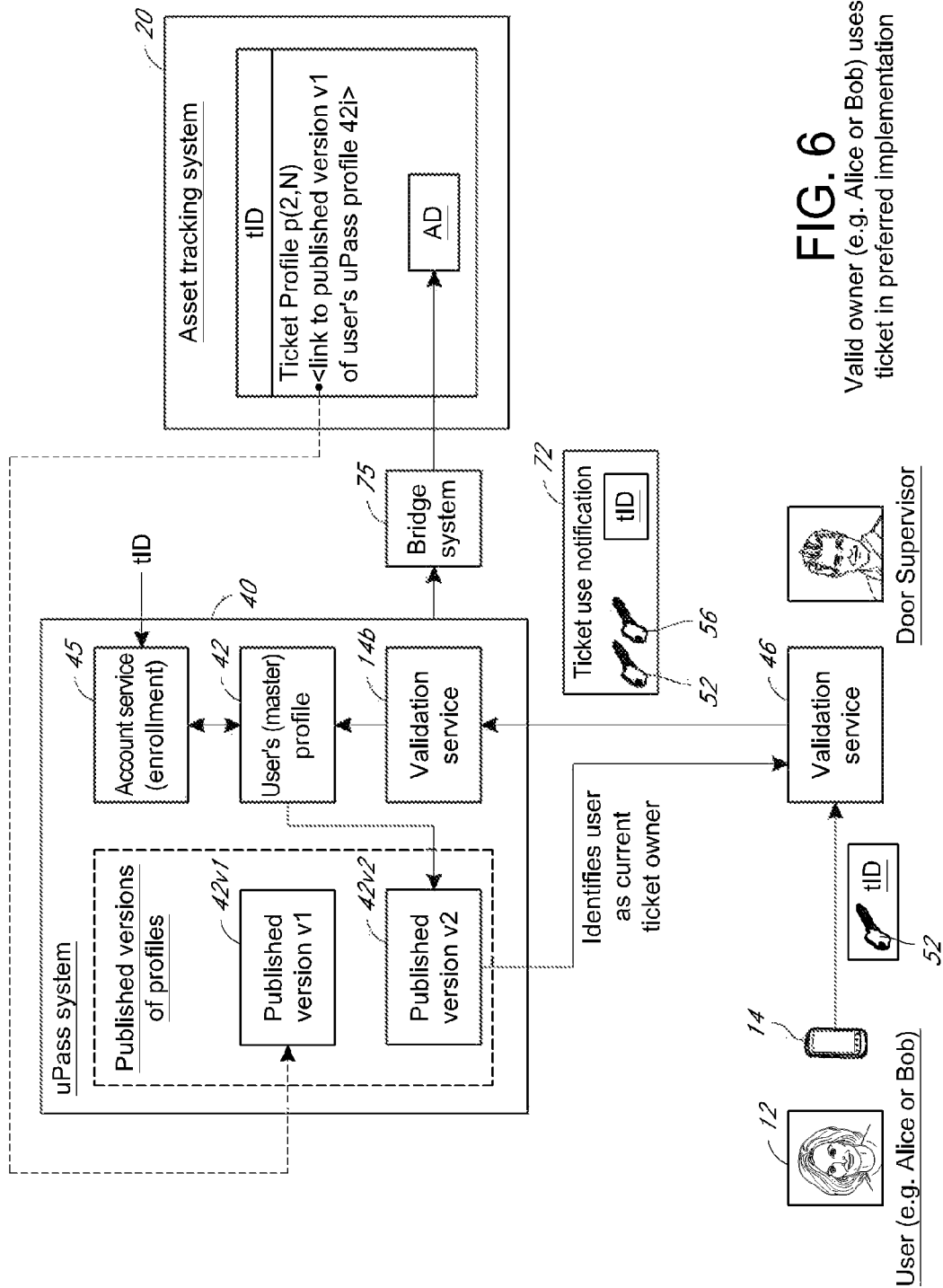
FIG. 6 shows a preferred mechanism by which a legitimate ticket holder can use their ticket.

FIG. 6 shows a preferred mechanism by which a ticket owner 12 (e.g. Alice or Bob) and use a ticket that is rightfully theirs. In FIG. 6 the identity of the ticket owner is conveyed to the validating device 46 from the uPass system 40, rather than the asset tracking system 20. The user sends the ticket identifier tID from their device 14 along with their uPass credential to the validating device 46. The validating device, in turn, sends the ticket identifier tID, the user's credential 52 and their own credential in the ticket notification 72, which is sent to the uPass system 40 in this example. The validation service 14b validates the credentials 52, 54 and provided they are both valid and provided the user's credential 52 is bound to the same profile 42 as the ticket identifier tID has been enrolled with, it causes a version of the user's profile 42v2 to be published. A receipt is sent to the validating device 46, which comprises a link to this version 42v2 so that the door supervisor can see the identity data (e.g. selfie) of the ticket owner, and compare it against the person 12 standing in front of them. If, on the other hand, the user's credential 56 were bound to a uPass profile which does not match a uPass profile with which the ticket identifier is enrolled (meaning that the user is not the true ticket owner), the system 40 can detect that the user is attempting to use the ticket illegitimately. Moreover, if the door owner were to indicate to the system 40 via their device 46 that the person 12 in front of them does not match the selfie of the true owner supplied by the system 40, they can inform the system 40 via their device that an illegitimate ticket use has been attempted. In either case, the system 40 may be configured so that the ticket does not expire as a result of an illegitimate attempted use.

The uPass system 40 communicates with the asset tracking system 20 via the bridge system 75 to add the attendance data to the records in the asset tracking system 20.

The asset tracking system will also record the user 12 as the true owner of the ticket in the profile p(2,N) for the ticket. This profile also links back to the uPass system 40, as it comprises a link to an earlier published version of the user's profile 42v1, published in the uPass transaction conducted to transfer the ticket to the user 12.

To provide additional robustness, the identity of the ticket owner could be verified using both the uPass profile and the ticket profiles in the asset tracking system 20, or the asset profiles could be used as a fall back.

Currently, tickets for different events tend to be managed in a disjointed and disparate manner using different bespoke, non-interoperable ticket management mechanisms, in a manner that would make it difficult to detect touting behaviour across these different systems.

In contrast, in embodiments of the described technology, ticket management for many events can implemented using a common uPass system 40 and/or a common asset tracking system 20. Harmonizing ticket management in this manner provides a central source of ticket usage data, and thus ensures that a wider base of data is readily available which can be used to detect touting.

In some embodiments, identity data of the buyer's uPass profile 42i in the uPass system 40 is located in the system using the ticket identifier received in the ticket use notification, as that identifier has been previously associated by that profile 42i by enrolling the ticket identifier as a virtual device of the buyer when they purchased it.

If the compared sets of identify data do indeed match i.e. if it is determined that the presenter and the original buyer are the same person, then the anti-touting metric ATM of the buyer changes to reflect this, in this example by increasing the percentage (because this constitutes one more event the buyer has shown up to). This increases the chance of the buyer being able to buy tickets to events in the future within the digital identity system.

Conversely, if the compared sets of identity data do not match, i.e. if it is determined that the presenter is different from the purchaser, then in some (though not in all) cases the anti-touting metric ATM changes to reflect this, in this example by reducing the percentage. A scenario in which the metric ATM may not be changed is where the purchaser has purchased two or more tickets to the same event, kept one for him or herself and legitimately given or sold the other(s) to a friend, as mentioned earlier. Preferably a mechanism for distinguishing between touts and legitimate owners is provided, so that those who sell to genuine friends (for example) are not labelled as touts. This mechanism may be provided by the analyzer 29, and be based on a network analysis, in particular based on the size of a network of entities in which tickets are spread as mentioned previously.

In some embodiments, touting behaviour may also be detecting in those who do may obtain tickets directly from the broker 19, but rather indirectly from other entities e.g. through gifts or re-sales that are recorded in the sequence of profiles P.

This allows for the detection of entities who are linked to touts, for example where a tout buys 6 tickets (if initially permitted to do so) and associates 5 of those tickets with "friends" but none of those friends attend the event. Instead the tout or the "friend" always sells on/transfers on the ticket to a fan—either via a reseller site, or via a real-world (e.g. pub or outside event) handover. In some cases, the system may also target those who buy from proven touts, and make it harder for them to obtain tickets in the future, so as to further discourage the practice of touting.

If unique individuals seem to exhibit low use/temporary 'ownership' behaviour despite not originally purchasing the ticket, some event owners will want to ban such non fans (fans usually go to the events if they get a ticket, even if they didn't buy the ticket). That is, the system may favour those who actually turn up at events regardless of how they obtained a ticket, and penalise those who don't.

The anti-touting metric UD in already published versions of the buyer's uPass profile 42i in the uPass system 40 may not modified—in some cases only the underlying master profile 34B is modified, which can of course effect future publications of that uPass profile 42ii.

All of the various functional modules described above and shown in the figures are implemented as code 4 executed on the processor(s) 2.

A uPass implementation of the digital identity system 40 is just one example. In other embodiments, the digital identity could for example be implemented as a single sign-on system. As an example, the digital identity system 40 could be Google+. Examples of other suitable profile-based digital identity system technologies that could be used include: Jumio; CallSign; MiiCard; VerifyMe; Facebanx; Identity.com; ThisIsMe and RealMe. In this respect, products in this field include IDScan, Paycasso TrustID, Au10tix, Idology, and IdChecker Note a ticket is just one example of an asset that can be tracked using the system 20 of the present disclosure, and all of the disclosure pertaining to tickets applies more generally to any other type of asset. Examples of assets include:
  hospital beds, which can be tracked from (say) ward-to-ward, room-to-room, hospital-to-hospital etc.;
  computers, photocopiers or other equipment, tracked from office-to-office, building-to-building, floor-to-floor, person-to-person, company-to-company etc.

patient records. For example separate profile chains may be maintained for diagnosticians, patients, attending physicians etc. e.g. to identify the entity that identifies a condition, the entity that has the condition, and the entity that treats the condition. In this case an asset transfer is a transfer of patient between responsible entities;

shares e.g. share certificates;

contracts.

Note: hereinabove, a number of hash functions are applied to concatenations S1∥S2 of bit strings e.g. H(S1∥S2). More generally, a hash function can be applied to any suitable function of the strings f(S1, S2) that retains sufficient information unique to each string, e.g. H(f(S1,S2)).

In the following, the term "initial profile" can be any profile in the chain with which at least one new profile is subsequently associated, and in general is not limited to, say, the first profile in a chain or the very first owner (though neither is excluded).

Another aspect is directed to a computer system for tracking assets comprising an asset tracking system, a digital identity system and a computer interface. The asset tracking system comprises electronic storage and a profile manager. The electronic storage of the asset tracking system holds an initial profile of an asset in association with an asset identifier of the asset. The digital identity system comprises a profile manager and electronic storage configured to hold profiles of entities. The computer interface is configured to receive asset transfer notifications. Each asset transfer notification identifies the asset and a respective entity participating in a transfer of the asset. The profile manager of the asset tracking system is configured to, each time an asset transfer notification is received, create in the electronic storage a new profile of the asset comprising an identifier of the respective participating entity. The new profile of the asset is stored in association with the asset identifier.

Entities own assets are tracked within the digital identity system, whilst the full history of the asset transfers is made available in the asset tracking system. An entity's own asset may for example be an asset they own, or which they otherwise hold, have some responsibility for, or relationship to. Thus two perspectives on the asset are provided: not only does an asset transfer change the identity of the participant within the digital identity system, it also changes the identity of the asset within the asset tracking system. The two systems are linked, in that they are responsive to the same asset transfers. Linking them in this manner ensures the two perspectives they provide are consistent. A participant in an asset transfer may for example be a new owner of the asset (more generally an entity newly responsible for, newly associated with the asset etc.), or a seller of the asset or broker of a sale or other transfer of the asset.

In preferred embodiments, the asset tracking system also comprises an association module configured to, each time a new profile of the asset is created, associate the new profile with the next most recent profile of the asset, thereby creating a temporal sequence of profiles representing a chain of transfers of (e.g. chain of ownership of) the asset. The temporal sequence is stored in association with the asset identifier.

Existing methodologies are ill suited to tracking individual assets reliably in multiple different contexts. For example, a system well suited to dealing with asset locations may be poorly equipped to manage multiple ownership changes or other multiple transfers. By contrast, the temporal sequence of the described technology held against the asset itself provides an accurate record of the chain of transfers for the asset, and constitutes a micro-database that is specific to the asset in question. A separate micro-database of this kind can be maintained for every individual asset tracked by the system.

Existing tracking methodologies also lack robustness to accidental or nefarious record alteration. In preferred embodiments of the described technology, one or more labels are assigned to respective profiles of the temporal sequence based on cryptographic hashing in a manner that provides robust integrity protection of individual profiles and/or the structure of the sequence as a whole. Among other things, the labels provide a mechanism by which any alteration of the profiles or sequence is detectable.

The system may comprise a label generation module configured to generate a label for each new profile in the sequence, that is then associated with that new profile, by applying a hash function to input data comprising:

(i) data of that new profile, and/or (ii) data of another profile (e.g. an earlier profile, such as the next most recent profile) in the sequence.

(i) provides integrity protection of the content of that new profile, whereas (ii) provides integrity protection of the sequence as a whole. That is, when the labels are generated from (i) it will be evident if the content of a profile has been altered (e.g. tampered with or accidentally compromised) as it will no longer match its own label; when generated from (ii), it will be evident if the structure of the sequence has been altered as at least one of the labels will no longer match the structure of the modified sequence: for example, consider a sequence of profiles (p0, p1, . . . , p(n), . . . ). If a label L(n) of a later profile p(n) is generated by hashing data of the next most recent profile p(n−1), if the sequence is tampered with to remove or move the earlier profile p(n−1), whichever profile ends up at position n−1 in the modified sequence will no longer match the label L(n) of the later profile p(n). More generally (though this is less preferred) this can be achieved by hashing data p (n±m) to generate L(n). If every link in the sequence is covered (which can be achieved by setting m to one of many appropriate values), then the entire structure of the sequence will be protected.

Preferably the label L(n) is generated by hashing both data of p(n) and data of p(n±m) (preferably n±m=n−1), as in this case the label L(n) provides both types of integrity protection simultaneously. In the described embodiments, the data of p(n±m) that is hashed is its own label L(n±m).

It can be detected whether the data to which any label relates has been altered for example by rehashing the data in the same way and checking whether or not the result matches the original label.

Preferably each label is also generated based on a secret key. For example, the key may also be included in the input data that is hashed to generate that label. This helps to prevent label forgery. As an example, the labels may be HMACs.

Alternatively or in addition, data of the earlier profile may be used as a seed input to the hash function, and the data of that new profile is used as a content input to the hash function. For example, the label generation module may be configured to generate a label for the initial profile by applying a hash function to at least data of the initial profile.

In this respect, another aspect is directed to a computer system for tracking assets comprising: electronic storage holding an initial profile of the asset in association with an asset identifier of the asset; a computer interface configured to receive asset transfer notifications, each asset transfer notification identifying the asset and a respective participant in a transfer of the asset; a profile manager configured to, each time an asset transfer notification is received, create in the electronic storage a new profile of the asset comprising an identifier of the respective participant; an association module configured to, each time a new profile of the asset is created, associate the new profile with the next most recent profile of the asset, thereby creating a temporal sequence of profiles representing a chain of transfers of the asset; and a label generation module configured to generate a label for at least one profile in the sequence by hashing input data which comprises data of the at least one profile and data of at least one other profile at a known position in the sequence (e.g. n−1 where n represents the location of the at least one profile, or more generally ±m), and store the label in association with the at least one profile.

In embodiments of aspects, the profile manager of the digital identity system may be configured to disassociate the asset identifier from a profile of the previous participating entity in the digital identify system when it creates the association in the digital identity system.

The computer system may be configured to store an association between the asset identifier and a first proxy asset identifier; and the association between the asset identifier and the profile of the respective participating entity in the digital identity system may be created by storing the proxy asset identifier in the electronic storage of the digital identity system in association with the profile of the respective participating entity.

Alternatively or in addition the computer system may be configured to store an association between the asset identifier and a second proxy asset identifier, each asset transfer notification comprising the second proxy identifier and thereby identifying the asset.

The asset tracking system may comprise an access module configured to, in response to receiving an asset owner identity request identifying the asset: generate an electronic response message identifying a current owner of the asset based on the most recent profile in the sequence and/or based on the profile of the current owner in the digital identify system, and transmit the response message to an instigator of the request.

For example, the response message may render available to the instigator a visual image of the current owner.

The initial profile may comprise an identifier of an initial owner of the asset.

At least one (e.g. some or all) of the profiles of the asset may comprise an identifier of a participating entity which comprises: a visual image of the participating entity, and/or a link to stored identity data of the participating entity, and/or a hash of at least part of a payment account number issued to the participating entity.

For example the link in the at least one profile of the asset may be a link to a version of the participating entity's profile in the digital identity system. E.g. the digital identity system may comprise a publication module configured to publish the participating entity's profile by storing a copy of it to an addressable memory location, the link in the at least one profile of the asset being a link to the addressable memory location.

Multiple temporal sequences of profiles may be stored in the electronic storage, each representing a chain of transfers (e.g. ownership) of a different asset.

The computer system may comprise an analyser configured to perform an analysis of the multiple sequences e.g. the assets may be tickets to one or more events, and the analysis may be performed to detect whether a touting condition is satisfied by at least one identifier of an owner that appears in at least some of the analyzed sequences.

Another aspect is directed to a computer-implemented method of tracking assets comprising: creating an initial profile of an asset in association with an asset identifier of the asset in electronic storage of an asset tracking system; and receiving asset transfer notifications, each asset transfer notification identifying the asset and a respective entity participating in a transfer of the asset, wherein each time an asset transfer notification is received, the method comprises: at a digital identity system: creating in electronic storage of the digital identity system an association between the asset identifier and a profile of the respective participating entity, at the asset tracking system: creating in the electronic storage of the asset tracking system a new profile of the asset comprising an identifier of the respective new owner, the new profile of the asset stored in association with the asset identifier.

Another aspect is directed to computer-implemented method of tracking assets comprising: storing an initial profile of the asset in association with an asset identifier of the asset in electronic storage; and receiving asset transfer notifications, each asset transfer notification identifying the asset and a respective participant in a transfer of the asset, wherein each time an asset transfer notification is received, the method comprises: creating in the electronic storage a new profile of the asset comprising an identifier of the respective participant, and associating the new profile with the next most recent profile of the asset, thereby creating a temporal sequence of profiles representing a chain of transfers of the asset; wherein the method also comprises: generating a label for at least one profile in the sequence by hashing input data which comprises data of the at least one profile and data of at least one other profile at a known position in the sequence; and storing the label in association with the at least one profile.

The methods may comprise steps to implement any of the system features described herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, or, any processor, controller, microcontroller, or state machine. A processor also may be implemented as a combination of electronic devices, such as a combination of a DSP and a microprocessor, a plurality of microprocessors, one or more microprocessors in conjunction with a DSP core, or any other such configuration.

In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments is not intended to be exhaustive or to be limiting to the precise form disclosed above. While specific embodiments and examples are described above for illustrative purposes, various equivalent modifications are possible within the scope of the inventions described herein, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not only the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

Whilst the above has been described with reference to specific embodiments, these are exemplary and other variations may be apparent to the skilled person. The scope is not limited by the described embodiments but only by the following claims.

What is claimed is:

1. A computer system, comprising:
    a data store holding: a plurality of profiles, each of a respective entity and stored in association with past ticket usage data indicating a probability that the respective entity would personally use a ticket issued to them based on a history of past ticket usage;
    a computer interface configured to receive a ticket request from a requesting device via a computer network, the ticket request identifying a profile of a requesting entity;
    one or more processors configured to execute code for managing tickets, the code configured when executed to implement:
        a ticket controller configured to: in response to the ticket request, determine whether a ticket should be issued to the requesting entity based on the past ticket usage data associated with the requesting entity's profile, and if so issue a ticket to the requesting entity in electronic form via the network,
        a receiving module configured to receive a ticket use notification from a validating device via the network, the ticket use notification indicating: identity data of the requesting entity and identity data of a presenting entity that has presented the issued ticket to the validating device, and
        a profile manager configured to: update the past ticket usage data associated with the requesting entity's profile based on the ticket use notification, wherein the updated past ticket usage data conveys whether the requesting entity presented the ticket themselves, wherein the identity data of the requesting entity and the identity data of the presenting entity comprise a hash of at least part of a payment account number issued to the requesting entity and a hash of at least part of a payment account number issued to the presenting entity respectively.

2. The computer system according to claim 1, wherein the updated past ticket usage data indicates the identity data of the requesting and presenting entities, and the one or more processors is configured to use the updated past ticket usage data to compare the identity data of the presenting entity with the identity data of the requesting entity to detect whether they match, wherein the ticket controller is configured to determine whether to reject a future ticket request from the requesting entity based on said comparison.

3. The computer system according to claim 1, wherein the identity data of the requesting entity and the identity data of the presenting entity are stored in the computer system and associated with a ticket identifier of the ticket; and
    wherein the ticket use notification comprises the ticket identifier and thereby indicates the identity data of the requesting entity and the identity data of the presenting entity.

4. The computer system according to claim 3, wherein the identity data of the requesting entity forms part of the requesting entity's profile.

5. The computer system according to claim 4, wherein the ticket request comprises a credential bound to the requesting entity's profile, and the one or more processors are configured to implement a validation service for validating credentials, wherein the ticket is issued only if the credential is valid.

6. The computer system according to claim 1, wherein the identity data of the requesting entity and the identity data of the presenting entity each comprise a string unique to that entity.

7. The computer system according to claim 6, wherein the unique string of the presenting entity is received from the validating device in the ticket use notification, having been presented to the validating device with the ticket by the presenting entity.

8. The computer system according to claim 1, configured to associate a profile identifying a true owner of the ticket with the ticket identifier, wherein an identifier of the true owner is transmitted to and outputted by the validating device in response to the ticket being presented to the validating device, and the updating of the past ticket data is conditional on a user of the validating device indicating via the validating device that the presenting entity is the true owner.

9. The computer system according to claim 8, wherein the profile of the true owner is associated with the ticket identifier in response to receiving a change of ownership notification identifying the ticket and the true owner.

10. The computer system according to claim 7, wherein the profile of the true owner is the profile of the requesting entity.

11. The computer system according to claim 1, wherein the computer system comprises an asset tracking system, and the identity data of at least one of the entities forms part of a profile of the ticket in the asset tracking system, the ticket use notification identifying the profile of the ticket.

12. The computer system according to claim 1, wherein the computer system comprises an asset tracking system, wherein a profile of the ticket in the asset tracking system comprises a link to the identity data of at least one of the entities, the ticket use notification identifying the profile of the ticket and the link being used to retrieve the identity data of the at least one entity.

13. The computer system according to claim 4, wherein the one or more processors are configured to implement an association module configured, in response to the ticket request, to create an association in the data store between the requesting entity's profile and a ticket identifier of the issued ticket, and wherein and the ticket use notification comprises the ticket identifier and thereby indicates the identity data of the requesting entity; and
    wherein the profile manager is configured to use the ticket identifier received in the ticket use notification to retrieve the identity data of the requesting entity for said comparison based on the association created by the association module.

14. The computer system according to claim 2, wherein said comparison is performed in response to receiving the future ticket request.

15. The computer system according to claim 1, wherein the ticket use notification indicates the identity data of the presenting entity by identifying a profile of the presenting entity that comprises that identity data.

16. The computer system according to claim 1, wherein the ticket use notification comprises the identity data of the presenting entity and thereby indicates it.

17. The computer system according to claim 1, wherein the ticket use notification comprises the identity data of the requesting entity and thereby indicates it.

18. A method implemented by a computer system comprising a data store holding a plurality of profiles, each of a respective entity and stored in association with past ticket usage data indicating a probability that the respective entity would personally use a ticket issued to them based on a history of past ticket usage, the method comprising:
   receiving a ticket request from a requesting device via a computer network, the ticket request identifying a profile of a requesting entity;
   in response to the ticket request, determining whether a ticket should be issued to the requesting entity based on the past ticket usage data associated with the requesting entity's profile, and if so issue a ticket to the requesting entity in electronic form via the network;
   receiving a ticket use notification from a validating device via the network, the ticket use notification indicating: identity data of the requesting entity and identity data of a presenting entity that has presented the issued ticket to the validating device; and
   updating the past ticket usage data associated with the requesting entity's profile based on the ticket use notification, wherein the updated past ticket usage data conveys whether the requesting entity presented the ticket themselves, wherein the identity data of the requesting entity and the identity data of the presenting entity comprise a hash of at least part of a payment account number issued to the requesting entity and a hash of at least part of a payment account number issued to the presenting entity respectively.

19. A computer program product comprising computer readable instructions stored on a non-transitory computer readable storage medium and which, when executed, configured to implement a method comprising:
   receiving a ticket request from a requesting device via a computer network, the ticket request identifying a profile of a requesting entity;
   in response to the ticket request, determining whether a ticket should be issued to the requesting entity based on past ticket usage data associated with the requesting entity's profile, and if so issue a ticket to the requesting entity in electronic form via the network;
   receiving a ticket use notification from a validating device via the network, the ticket use notification indicating: identity data of the requesting entity and identity data of a presenting entity that has presented the issued ticket to the validating device; and
   updating the past ticket usage data associated with the requesting entity's profile based on the ticket use notification, wherein the updated past ticket usage data conveys whether the requesting entity presented the ticket themselves, wherein the identity data of the requesting entity and the identity data of the presenting entity comprise a hash of at least part of a payment account number issued to the requesting entity and a hash of at least part of a payment account number issued to the presenting entity respectively.

\* \* \* \* \*

UNITED STATES PATENT AND TRADEMARK OFFICE
CERTIFICATE OF CORRECTION

PATENT NO. : 9,519,796 B1
APPLICATION NO. : 14/726315
DATED : December 13, 2016
INVENTOR(S) : Eleanor Simone Frederika Loughlin-McHugh It is certified that error appears in the above-identified patent and that said Letters Patent is hereby corrected as shown below:

In Column 8 at Line 51, Change "OR" to --XOR--.

Signed and Sealed this
Thirteenth Day of June, 2017

Joseph Matal
*Performing the Functions and Duties of the
Under Secretary of Commerce for Intellectual Property and
Director of the United States Patent and Trademark Office*